United States Patent [19]

Oguino et al.

[11] 4,416,002
[45] Nov. 15, 1983

[54] METHOD AND APPARATUS FOR HIGH-DENSITY RECORDING AND REPRODUCTION

[75] Inventors: Masanori Oguino; Tooru Fujishima, both of Yokohama; Jun Matsumoto, Odawara, all of Japan

[73] Assignee: Hitachi, Ltd., Tokyo, Japan

[21] Appl. No.: 363,147

[22] Filed: Mar. 29, 1982

Related U.S. Application Data

[63] Continuation of Ser. No. 28,706, Apr. 10, 1978, abandoned.

[30] Foreign Application Priority Data

Apr. 10, 1978 [JP]  Japan .................... 53-41178
Dec. 22, 1978 [JP]  Japan .................... 53-157462

[51] Int. Cl.³ .................... G11B 21/10; G11B 27/28
[52] U.S. Cl. ......................... 369/44; 358/342; 360/77; 369/54
[58] Field of Search .............. 369/44, 54, 100, 275; 358/128.5, 128.6; 360/70, 77

[56] References Cited

U.S. PATENT DOCUMENTS

| | | | |
|---|---|---|---|
| 3,663,763 | 5/1972 | Trost | 360/70 |
| 3,893,163 | 7/1975 | Wessels et al. | 358/128.5 |
| 3,906,152 | 9/1975 | Hoogendijk | 369/124 |
| 3,931,460 | 1/1976 | Watson | 179/100.3 V |
| 3,978,279 | 8/1976 | Boruschewitz et al. | 369/61 |
| 4,007,493 | 2/1977 | Behr et al. | 360/77 |
| 4,010,490 | 3/1977 | Ota | 358/8 |
| 4,037,252 | 7/1977 | Janssen | 360/77 |
| 4,067,044 | 1/1978 | Maeda et al. | 179/100.3 V |
| 4,079,412 | 3/1978 | Kosaka | 358/8 |
| 4,134,126 | 1/1979 | Hirai | 360/33 |
| 4,148,082 | 4/1979 | Okada et al. | 179/100.3 V |
| 4,160,268 | 7/1979 | Goto et al. | 360/77 |
| 4,190,859 | 2/1980 | Kinjo | 369/124 |
| 4,236,050 | 11/1980 | Winslow et al. | 369/47 |

OTHER PUBLICATIONS

Bussche et al., "Signal Processing in the Philips 'VLP' System", Philips Tech. Rev. 33, pp. 181-185, 1973, No. 7.

Primary Examiner—Stuart N. Hecker
Attorney, Agent, or Firm—Antonelli, Terry & Wands

[57] ABSTRACT

A recording/reproduction system is disclosed in which main information in the form of high-frequency signal is recorded in time sequence along a multiplicity of tracks adjacent to each other. A discrimination signal is superimposed on the high-frequency signal in advance for recording and has a different occupied frequency band for each adjacent track, whereby discrimination of lead or lag in track arrangement is accomplished. The difference of the discrimination signal between tracks may take the form of phase difference with the same frequency or signals of different frequencies.

8 Claims, 36 Drawing Figures

U.S. Patent  Nov. 15, 1983  Sheet 1 of 10  4,416,002
FIG. 1 PRIOR ART
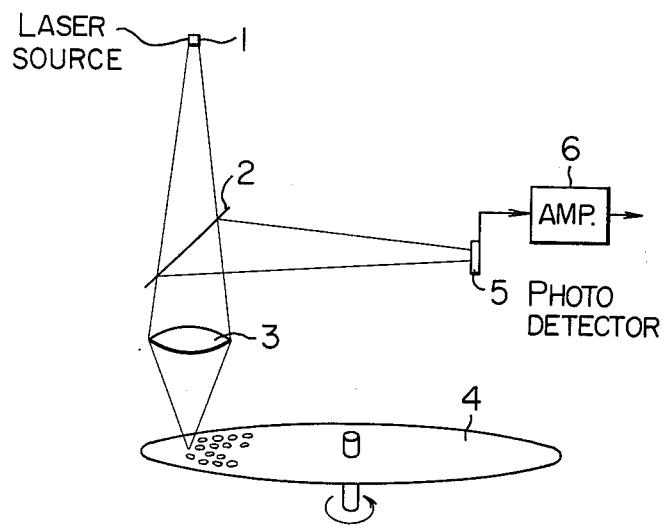
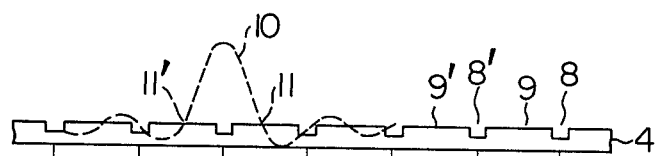
FIG. 2a
FIG. 2b
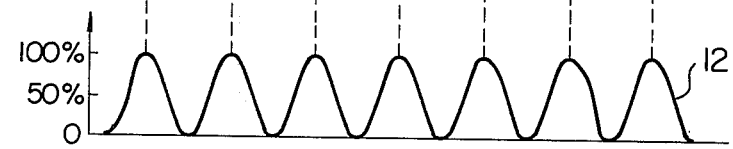
FIG. 3a
FIG. 3b
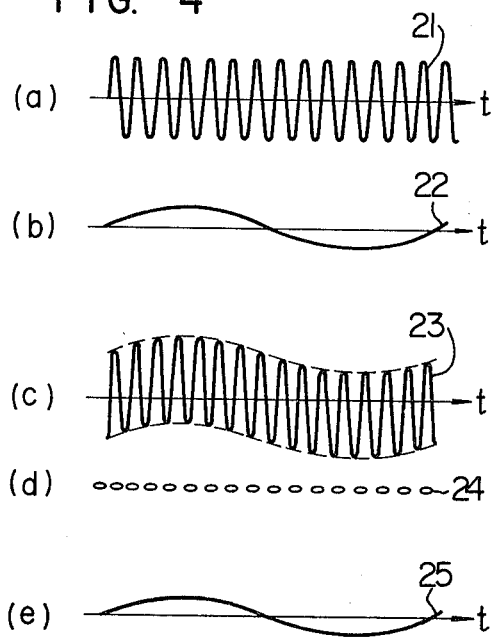
FIG. 4

(a)

(b) $4n+0$
$\cos \omega t$ (c) $4n+1$
$\cos(\omega t - \frac{\pi}{2})$ (d) $4n+2$
$\cos(\omega t - \pi)$ (e) $4n+3$
$\cos(\omega t - \frac{3}{2}\pi)$ FIG. 11
FIG. 12
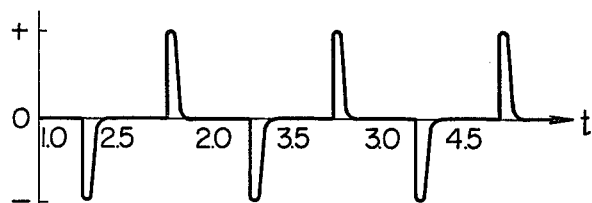
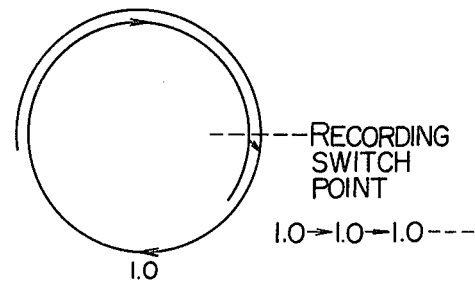
FIG. 13
FIG. 14
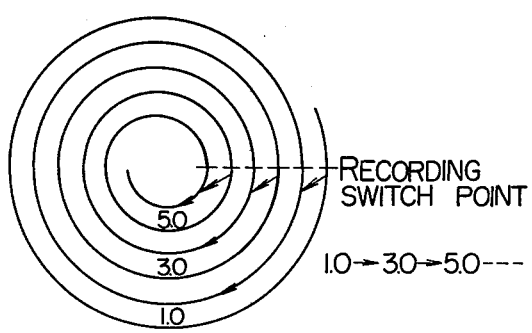
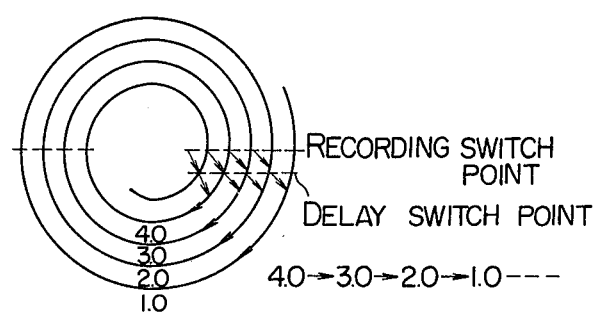
FIG. 15
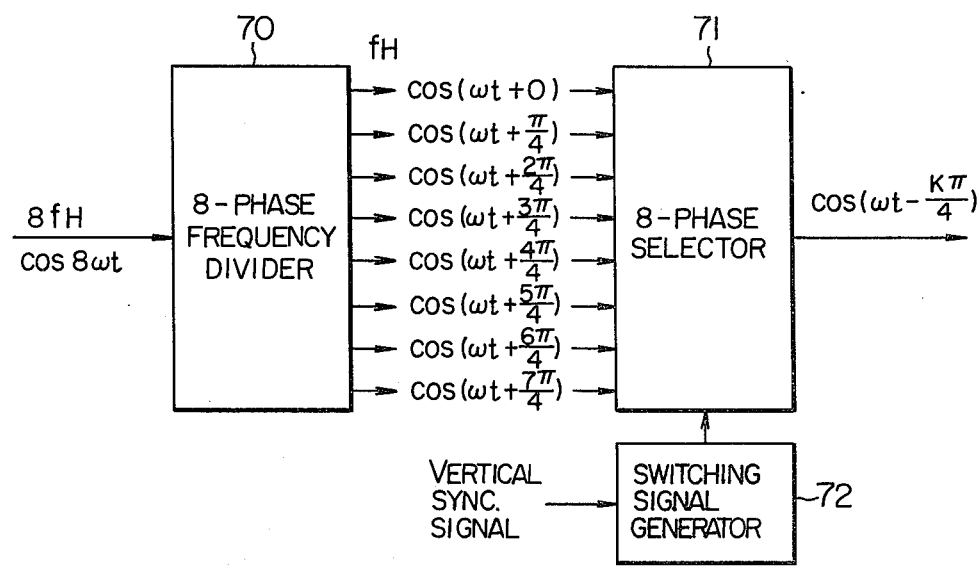

(3N+0)th TRACK, $f_0$
(3N+1)th TRACK, $f_1$
(3N+2)th TRACK, $f_2$ (a) (3N+0)th TRACK
(b) (3N+1)th TRACK
(c) (3N+2)th TRACK

FIG. 25
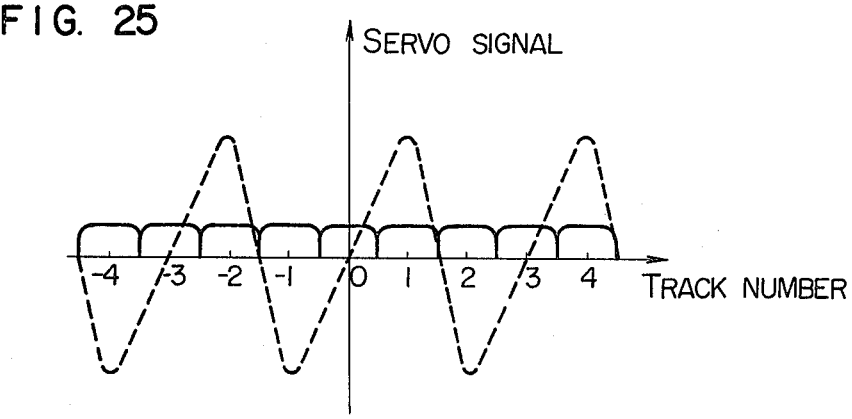
FIG. 26
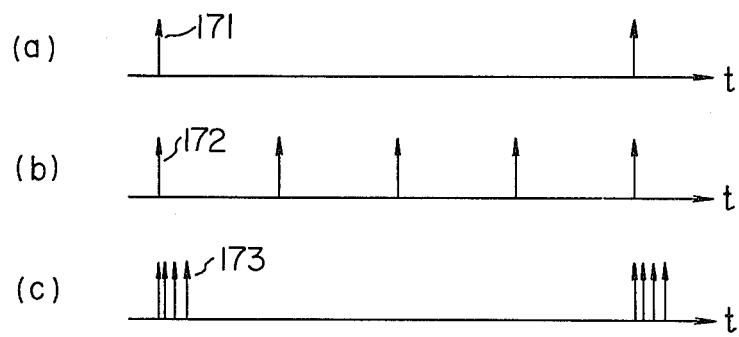
FIG. 27
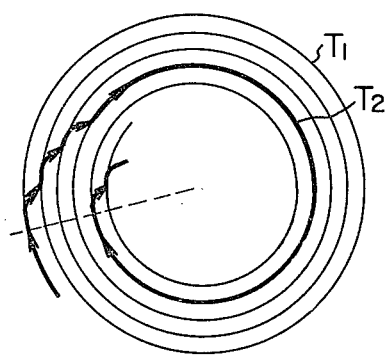
FIG. 28

METHOD AND APPARATUS FOR HIGH-DENSITY RECORDING AND REPRODUCTION

This is a continuation of application Ser. No. 28,706, filed Apr. 10, 1978, now abandoned.

BACKGROUND OF THE INVENTION

The present invention relates to a technique for recording a signal on a flat recording medium, or more in particular to a method and apparatus for recording a signal with an improved density and a tracking technique for reproduction.

An example of a flat recording medium is one used in the technique known as the video disc player which utilizes light or change in electrostatic capacity in reproduction. The present invention is applicable to both types of method. Especially, it is an art suitably applied to a system using a recording medium without any guide slot in the recording track.

An example of the reproducing apparatus using light for reproduction is shown in FIG. 1. In the drawing under consideration, the essential parts are illustrated schematically. Reference numeral 1 shows a light source, numeral 2 a half mirror, numeral 3 a lens, and numeral 4 a recording medium in the form of disc. The surface of the disc 4 where information is recorded is comprised of a reflection surface coated with aluminum or the like. The information such as a video signal or an audio signal generally takes the form of a modulated carrier wave recorded as a repetition of pits along a spiral track, i.e., spatial frequency. A pit is represented by a small dent on the reflection surface which is as large as, for example, 0.4 μm wide, 0.8 μm long and 0.15 μm deep. The pit width is called a track width, and the distance between adjacent tracks a track pitch. The track pitch is generally set at about 1.7 μm in the conventional system.

The light from the laser light source is condensed at the information recording surface of the disc 4 by the lens 3 through the half mirror 2. Part of the light reflected on the information recording surface is reflected on the half mirror and condensed at a light receiver 5 such as a photo-diode. The amount of light reflected depends on the absence or presence of a pit. The change in the amount of light applied to the light receiver 5 is taken out as an electrical signal and after being amplified by the amplifier 6, processed as required. Such a reproduction system is disclosed in detail, for example, in Journal of the SMPTE, July 1974 Volume 83 P. 564 to 566 "The Philips 'VLP' system" by K. Compaan et al, P. 567 to 571 "Signal processing in the Philips 'VLP' system" by W. van den Bussche et al, P. 572 to 575 "The optical scanning system of the Philips 'VLP' record player" by G. Bouwhis et al, and P. 576 to 579 "Control mechanisms in the Philips 'VLP' record player" by P. J. M. Janssen.

FIG. 2a shows an enlarged sectional view of the disc 4 cut away radially, in which a mirror reflection surface is shown. Actually, this surface is coated with a plastic protective film, which is not shown in the drawing. Numerals 8 and 8' show pit positions for each track. The dents as shown are formed in the presence of pit. The dashed line curve 10 shows a profile of the light beam spot, and numerals 11 and 11' feet at which the amplitude of light becomes zero. These points are called null points and the distance therebetween a null width.

The disc makes 30 rotations in one second, in accordance to which the light spot scans the spiral track. In accordance with the presence or absence of the pit, the amount of light passed from the disc to the lens changes. This change is taken out as an electrical signal. As well known, in the absence of a spot on the pit, that is, in the presence of a spot on the mirror surface, all the reflected light returns to the lens. In the presence of a spot on the pit, however, the return light is directed both to the right and left by diffraction, and therefore substantially no light returns to the lens. In order to assure an effective diffraction, the pit depth is set at about one fourth of the wavelength of the laser beam.

A rotary disc poses a problem of eccentricity. Generally, an eccentricity of about 100 μm occurs. This corresponds to about 60 tracks in view of the track pitch of 1.7 μm. In FIG. 1, it is well known that the lens or the like is vibrated laterally to follow the lateral displacement due to the eccentricity. The problem is the means for detecting the positional displacement of a desired track, for which several conventional methods are suggested, all based on the principle described below.

In the graph of FIG. 2b containing the curve 12, the abscissa represents the radial coordinate of the disc around the spot and the ordinate the detected information output of the light receiver 5 shown in FIG. 1. As seen from this drawing, when the spot center is positioned exactly on the track, the maximum information output is produced, while it is positioned between tracks, the information output is zero. Thus, the magnitude of the information output (the envelope amplitude of the high frequency signal or the magnitude of the DC portion representing the average reduction in return light) presents an index showing the degree of coincidence between the track center and spot center, although the right and left polarities of the displacement are not known. A conventional method to overcome this problem is what is called the "wobbling method" in which the spot position is vibrated finely at about ±0.2 μm. The right and left polarities are determined by the resulting direction of the gradient of the change in the information output.

In another conventional method for determining the polarity of displacement, a plurality of light beam spots exclusive for track position detection are used in addition to the main light beam spot.

Anyway, in the conventional methods, the fact is utilized that when the spot is displaced from the track center, the information output is reduced, as shown in the curve 12 of FIG. 2b. Since the reduction in the information output is laterally symmetric, a complicated optical system is inconveniently required for determination of the polarity.

Another problem is that of recording density. In the case of FIG. 2a, the null width of the spot is substantially equal to the track pitch. The result of halving this track pitch is shown in FIGS. 3a and 3b. As seen from 13 of FIG. 3b, the information output is substantially constant regardless of the positional displacement of the spot center. In other words, as long as the spot is situated on the desired track center, only the desired track information is capable of being picked up. When the spot is displaced from the track center, on the other hand, the desired track information is reduced in accordance with the magnitude of displacement on the one hand and the adjacent track information is increased in accordance with the magnitude of displacement, resulting in a substantially constant total information output.

Thus, it is impossible to use the conventional track position error detecting system which relies on the fact that the information output is reduced in the bottom between tracks. In the conventional systems, therefore, the limitation is posed in which the recording density must be set in about the relation between the spot width and the track pitch as shown in FIG. 2a.

Generally, the null width N of the light beam spot is substantially equal to the wavelength of the laser beam divided by the numerical aperture of the lens. It is technically very difficult to reduce this value. Therefore, it is desired to achieve the minimum recording pitch at a constant null width of the spot. In the conventional systems, however, the principle of the track position error detecting means poses a restriction almost as shown in FIG. 2a.

In one of the conventional methods which uses no light for reading an information signal, a pit array similar to the method using an optical system is provided on a conductive disc, and the presence or absence of the pit is read as a change in electrostatic capacity. Such a method is disclosed, for instance, in RCA Review Volume 39 No. 1 March 1978, P. 7 to 13 "The RCA 'Selectavision' Video Disc System" by D. S. McCoy. In this method, a continuous slot or groove is formed along with the S-shaped pit array, so that a pit array modulated by the information signal is formed in the S-shaped continuous slot. For this reason, a signal-reading stylus traces the inside of the slot as in the conventional audio disc record thus attaining an automatic tracking. In this system having a tracking slot or groove, it is impossible to reproduce a still image after recording a video signal, that is, it is impossible to trace the same track repetitively by turning the stylus to the same track for each rotation of the disc.

In order to meet the requirement for still image reproduction, a recording-reproduction method has been developed in which a pit array lacking a stylus guide slot is formed and the change in electrostatic capacity is utilized. In this system lacking the slot for guiding the signal reading stylus, a pilot pit array carrying the pilot signal for tracking is provided between adjacent pit arrays for the main information signal. In the reproduction system, this pilot signal is read and any displacement of tracking is thus detected for the purpose of tracking by an automatic control through a tracking servo system. The advantages of this system are that as in the optical system, reproduction of a still image and reproduction at a speed different from the ordinary speed is easy and that the fact that the pressure of the stylus for signal reading is maintained comparatively low lengthens the life of the disc and stylus.

In spite of this advantage, this system has the shortcoming that the recording operation requires two light beams including the main light beam for main signal recording and the pilot light beam exclusive to pilot signal recording. The pilot beam is capable of being produced by separation and synthesis from the main beam by using a half mirror. In view of the requirement for high recording density, however, the distance between the main beam and pilot beam must be maintained at high accuracy of about 0.7 μm±0.1 μm on the disc. The mounting of the half mirror makes it very difficult to maintain such an accuracy in recording process. A slight temperature change, vibration or change with time often results in an error and a reduced recording yield, thus posing a problem in the industrial application thereof. Also, a photo-resist photo-sensitive film process is required in the course of recording and therefore inclusion of dust and dirt often leads to a defect on the disc.

SUMMARY OF THE INVENTION

Accordingly, it is an object of the present invention to provide a novel system using a disc-type recording medium in which a track position error is detected stably even when recording operation is conducted at high recording density and in which the main signal and the pilot signal for tracking are combined into a single light beam for recording.

In order to achieve the above-mentioned object, this invention actively utilizes the crosstalk from the right and left adjacent tracks on the principle of track position error detection. For this purpose, the present invention has the feature that a pilot signal for tracking is inserted in the pit array for the main signal, so that in recording the pilot signal, the pilot signal may only be added to the main information signal as an electrical signal. This pilot signal has a different frequency and phase so that it may be easily distinguished from the main information signal on the one hand and from the pilot signals on the right and left adjacent tracks for every rotation of the track on the other hand.

By doing so, for the recording purpose, only one light beam or one cutting head is required and an additional light beam for the pilot signal is not required, thus facilitating the production of the recording disc. Further, the right or left of the tracking position error is identified by the tracking signal detected from the adjacent tracks, with the result that the need for spacing the tracks is eliminated, thus making possible a higher density recording.

BRIEF DESCRIPTION OF THE DRAWINGS

FIG. 1 is a diagram schematically showing a configuration of the essential parts of the video disc player of optical type.

FIG. 2a is a partial sectional view of a video disc and a spot profile.

FIG. 2b is a graph showing the relation between the spot movement and the detection output associated with FIG. 2a.

FIGS. 3a and 3b are a sectional view and a graph for a higher recording density, similar to those shown in FIGS. 2a and 2b respectively.

FIG. 4 shows a signal waveform for explaining the duty factor modulation of the recording pit.

FIG. 11 is a waveform diagram showing the error timing information.

FIGS. 12 to 14 are track locus diagrams for explaining the operations of still reproduction, multiple-speed reproduction and reverse reproduction respectively.

FIG. 15 is a block diagram of the device for producing a discrimination signal according to another embodiment of the present invention.

FIG. 25 is a discrimination characteristic curve diagram for explaining the theory of the tracking discrimination according to a second fundamental embodiment of the present invention.

FIG. 26 shows waveforms of a timing pulse.

FIG. 27 is an enlarged plan view showing a track for explaining the four-fold speed reproduction.

FIG. 28 is a plan view showing an example of recording of a pilot signal according to a third fundamental embodiment of the present invention.

DESCRIPTION OF THE PREFERRED EMBODIMENTS

Figure 5:
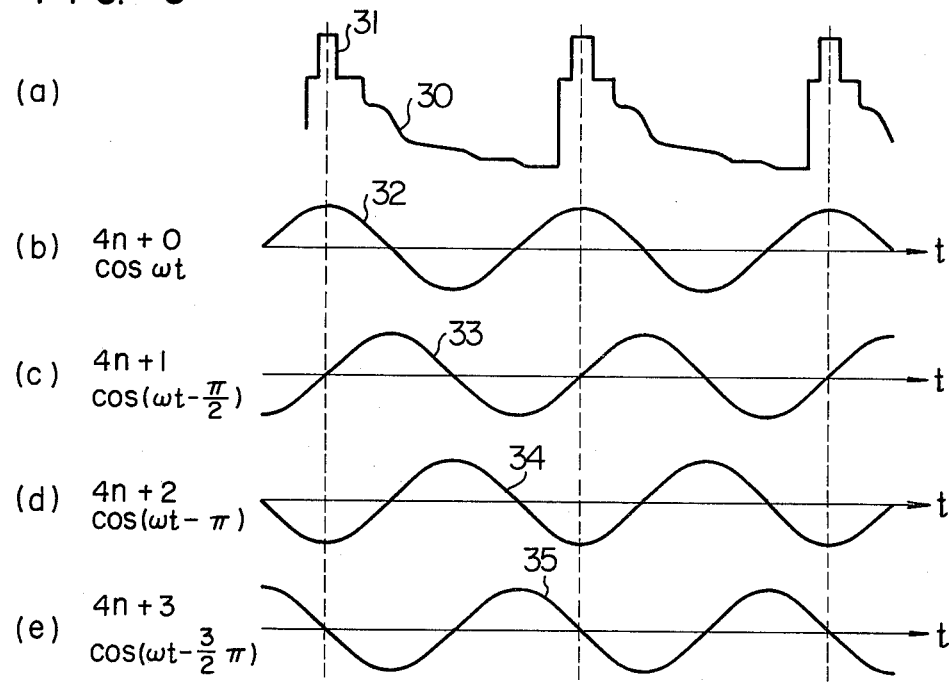
FIG. 5 is a waveform diagram showing an example of the discrimination signal used in the present invention.

First, the operating principle of the present invention will be explained. The main information signal is generally converted into a recording signal in the form of a high frequency signal modulated by the information signal. This signal generally has the frequency of about 8 MHz as an example of waveform thereof is shown in FIG. 4(a). FIG. 4(b) shows an example of the signal used for error detection of tracking and has, for instance, a sufficiently low frequency as compared with the high frequency signal 21. This low frequency tracking signal 22 is added to the high frequency signal 21, thereby producing a waveform as shown in FIG. 4(c). In each of these diagrams, the relation between the two frequencies is not shown exactly but only simply for facilitating the understanding. This synthesized signal 23, after being amplified and amplitude-limited, is applied as a driving signal to the recording system for the recording medium. As a result, the recording pit 24 with the length corresponding to the width of the zero cross point of the waveform shown in FIG. 4(c) is obtained as shown in FIG. 4(d). In this way, the duty factor of the pit is modulated by the tracking signal.

In reproducing this signal, the apparatus such as shown in FIG. 1 is used in such a manner that the output signal of the amplifier 6 is applied through a low-pass filter, thus producing the tracking signal 25 as shown in FIG. 4(e). The techniques for bias recording and reproduction of such a low-frequency signal are well known in the operating principle of the video disc and video tape recorder. The gist of the operating principle of this invention lies in the manner in which the right and left of the adjacent tracks are discriminated by this low-frequency tracking signal. According to this invention, the discrimination is conducted by use of a tracking discrimination signal with the phase thereof changing for each round of track or by use of a tracking discrimination signal changing in frequency.

First, explanation will be made of an example using the discrimination signal with the phase thereof changing. FIG. 5 shows an embodiment of the discrimination signal. FIG. 5(a) shows a video signal 30 making up the main information for modulating the carrier to form an FM signal. In this signal, 31 shows a horizontal synchronizing signal. FIG. 5(b) shows a track discriminating signal 32 for the 4n-th track (n: an integer). The phase difference between this signal and the horizontal synchronizing signal 31 is zero. FIG. 5(c) shows a discrimination signal 33 for the (4n+1)th track, which is delayed in phase by $\pi/2$ radian as compared with the horizontal synchronizing signal. FIG. 5(d) shows a discrimination signal 34 for the (4n+2)th track, the phase of which is delayed from the horizontal synchronizing signal by $\pi$ radian. FIG. 5(e) shows a discrimination signal 35 for the (4n+3)th track, the phase of which is delayed from the horizontal synchronizing signal by $3\pi/2$ radian. In other words, the discrimination signals are offset from each other by one fourth of a wavelength in the order of the track number arranged. In this drawing, the abscissa represents the rotational angle of the disc. The general configuration of a system having a constant rotational speed is assumed in which an image corresponding to the horizontal period containing 525 scanning lines in one frame, that is two fields, is recorded for each track.

In a system of a variable rotational speed in which the rotational speed is reduced toward the outer periphery of the disc with the track speed maintained constant, on the other hand, the disc rotational phase may be used as the reference phase instead of the horizontal synchronizing signal. They will all be hereinafter referred to as the rotational phase.

Figure 6:
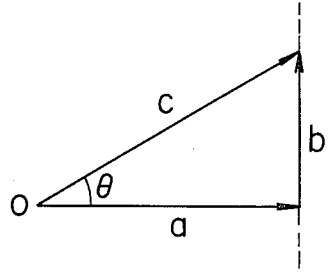
FIG. 6 a vectorial diagram for explaining the principle of tracking error discrimination by the discrimination signal.

The track discrimination logic of the present invention will be explained with reference to FIG. 6. In the drawing, assume that a denotes the magnitude of the discrimination signal vector detected from the desired track. Assume also that due to the eccentricity or the like, the spot center is displaced rearward slightly from the desired track center. By the crosstalk from the rear adjacent track, a component 90 degrees advanced in phase is superimposed on the discrimination signal in the proportion determined by the amount of displacement of the track. This is shown in b of the same drawing. As a result, the entire phase of the discrimination signal detected has a lead deviation of $\Delta\theta$ as shown by the vector c. This lead deviation of $\Delta\theta$ is detectable by the well-known synchronous detection technique or phase detection technique as described later. In the case where the spot is advanced from the desired track, on the other hand, the phase of the discrimination signal has a delayed deviation. Thus, it is possible to provide a proper solution to the problem of discrimination of the right and left of the track displacement which has so far been difficult to solve.

Figure 7:
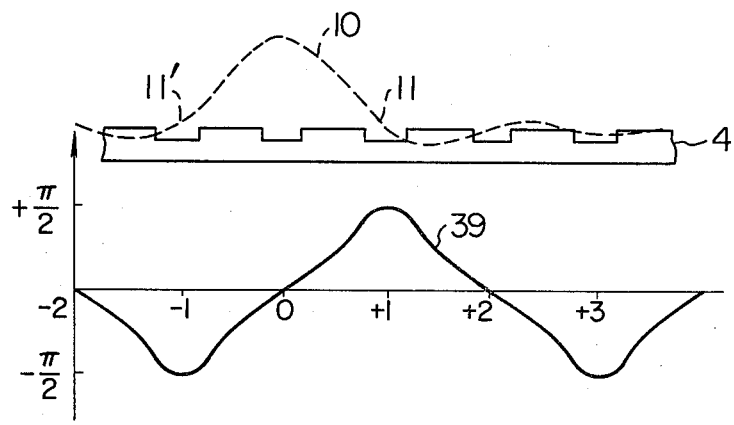
FIG. 7 is a discrimination characteristic curve shown together with the sectional view of the disc.

What is especially important in the foregoing description is that the phase deviation information including the discrimination signal is obtained continuously for the deflection of the spot center from the track center, as shown in FIG. 7, related to FIGS. 2a and 2b. The abscissa represents the deflection of the spot center from the desired track center as corresponding to the tracks of the disc 4 shown in the upper part of the drawing, and the ordinate represents the phase deviation of the discrimination signal. This is the feature made possible only by the fact that the discrimination signal is inserted in the form of duty factor of the pit, i.e., the form of low-frequency information of the reproduction signal. Assume, on the other hand, that the discrimination signal is inserted in the form of frequency information of the high frequency signal by being superimposed on the main information. Even if the crosstalk may occur, it is impossible to pick up the track displacement continuously due to the threshold phenomenon specific to the FM demodulation process, resulting in an interrupted track displacement being picked up.

According to the present invention, the phase deviation of the discrimination signal along the ordinate is obtained as a continuous amount with respect to the track displacement along the abscissa. Therefore, even a slight track displacement can be caught with high sensitivity, so that it is used as a correct positional error detection information in the high track density recording. Also, it is seen from the same drawing that the phase deflection information takes the form of a periodic function for each four track displacements. Thus even if transfer is made instantaneously to the adjacent track by such an external disturbance as dust on the disc, such an undesirable situation is immediately corrected unlike in the conventional systems. In the prior art, as shown by the curve 12 of FIG. 2, the discrimination logic takes the form of a periodic function for each one track, and therefore once transfer is made to an adjacent track, that situation continues very unstably against external disturbances.

The foregoing is the description of the type of discrimination signal and discrimination logic as a first embodiment of the present invention.

Next, the process of forming the discrimination signal in the recording operation will be briefly explained with reference to FIG. 8. This drawing shows the case in which the horizontal scanning frequency fH=15.734 KHz (NTSC system) is used as the discrimination signal frequency. As an input, the continuous wave of 4 fH in frequency is generated in advance, which is applied through, for instance, a frequency divider 40 of the ring counter type, thus producing a fH signal having four phases. In the drawing, cos ωt denotes a signal of 15.734 KHz in phase with the horizontal synchronizing signal. The discrimination signals thus obtained are switched by the four-phase selector 41 for each rotational period of the disc, with the result that the uppermost discrimination signal is obtained in the 4n−th track and the next discrimination signal in the (4n+1)th track and so on, thus producing regular 4-phase discrimination signals $\cos(\omega t - k\pi/2)$, where k is an integer showing the track number. The control circuit 42 for applying a track switching signal to the four-phase selector 41 is comprised of a pulse generator circuit for generating a pulse of 30 Hz which is obtained by frequency-dividing by one half the 60 Hz vertical synchronizing signal through a flip-flop. This control circuit 42 switches the phase by π/2 radian for each track, and the resulting four-phase discrimination signal produced from the four-phase selector 41 is recorded as the duty factor information of the pit on the principle explained with reference to FIG. 4.

Figure 9:
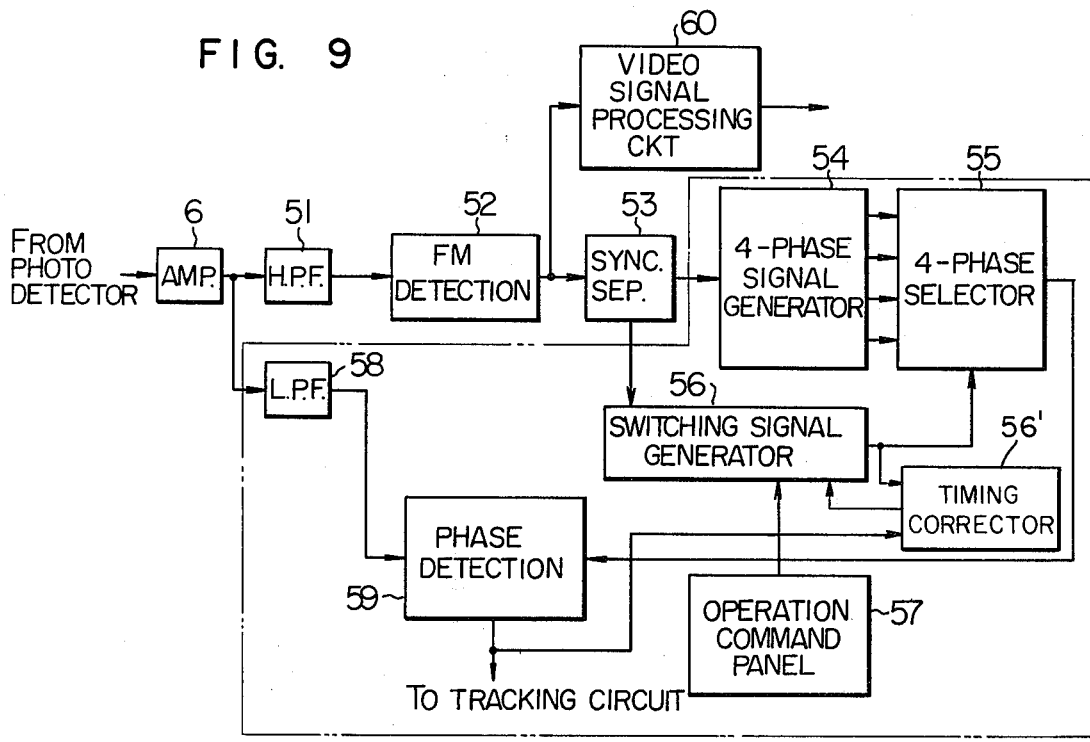
FIG. 9 is a block diagram showing the essential parts of the reproduction system according to a fundamental embodiment of the present invention.

The recording operation was explained above. Now, reproduction will be described. A block diagram for the reproduction system is shown in FIG. 9. The part surrounded by dotted line shows the essential parts of the present invention.

In the drawing under consideration, reference numeral 6 shows the same amplifier as used in the circuit of FIG. 1. Numeral 51 shows a high-pass filter for taking out the high frequency FM signal which makes up main information. Numeral 52 shows an FM demodulator, numeral 60 a video signal processing circuit, and numeral 53 a synchronizing signal separator circuit for taking out the horizontal synchronizing signal and the vertical synchronizing signal. Numeral 54 shows a four-phase signal generator circuit for generating four horizontal frequency signals with phase differences of π/2 radian, the output of which is the same as that of the four-phase frequency divider in FIG. 8. This four-phase signal generator 54 comprises, for instance, three stages of phase shifting circuits of π/2 radian in cascade from each of which an output is produced. Numeral 55 shows a four-phase selector which produces a four-phase reference signal $\sin(\omega t - k\pi/2)$ of the same types as the four-phase discrimination signal, where k is an integer which is increased by one according to the number of the pulse inputs from the switching signal generator 56. The main object of the switching signal generator 56 is to divide the frequency of the vertical synchronizing signal from the synchronizing signal separator circuit 53 by one half for generating a phase switching pulse identical to that generated at the recording end. As is well known, the output of the ½ frequency divider is a two-valued function, one of which has the timing information identical to that on the recording side. This is based on the fact that since two fields are recorded in one rotation of the disc, two vertical synchronizing signals are included in one rotational period. In order to assure the right phase switching timing, therefore, the timing is corrected with a reset pulse received from the output of the phase detector described later. Numeral 57 shows an operation command panel associated with the special reproduction function described later. This panel is not needed for the fundamental reproduction process.

Next, numeral 58 shows a low-pass filter for producing a low frequency four-phase discrimination signal read from the disc. This reproduction four-phase discrimination signal takes the form of $\cos(\omega t - k\pi/2 - \Delta\theta)$ where k is the track number as mentioned earlier, and Δθ deviation generated in accordance with the degree of advance of the spot center beyond the desired track. This signal and the reference four-phase signal $\sin(\omega t - k\pi/2)$ produced from the four-phase selector 55 are detected by the phase detector 59.

The phase detector 59 generally includes a multiplier and a low-pass filter. The output of the multiplier is expressed as $$\cos(\omega t - k\pi/2 - \Delta\theta) \times \sin(\omega t - k\pi/2) = \tfrac{1}{2}\sin\Delta\theta + \tfrac{1}{2}\sin(2\omega t - k\pi - \Delta\theta) \qquad (1)$$

This signal is subjected to low-pass filtering, so that an output proportional to sin Δθ is produced from the phase detector 59. Since Δθ is the information representing the right or left displacement of the spot center, the correct deflection information is detected as mentioned with reference to FIG. 7. It is well known that once the correct information is obtained, the lens of FIG. 1 is vibrated laterally or otherwise on the basis of this information, thereby making up an automatic track following system.

Figure 10:
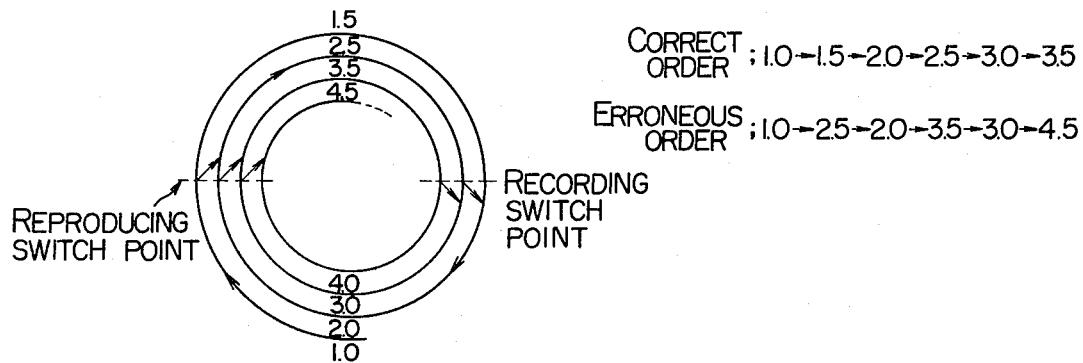
FIG. 10 shows a track locus for explaining the operation of this invention.

The description will be made again of the double value of the ½ frequency divider included in the switching signal generator 56. If the switching phase is incorrect, the deflection information in the form of positive or negative pulse is produced at the output of the phase detector 59 immediately following each vertical synchronizing signal. Such a phenomenon is shown in FIGS. 10 and 11. FIG. 10 shows the reproduction state at erroneous timing. In the case where the servo action of the track following system causes only the phase of the reference four-phase signal to be switched at the position of the vertical synchronizing signal to the left of the spiral track in the drawing, then the spot immediately jumps to the forwardly adjacent track erroneously. At the vertical synchronizing signal for the right, on the other hand, the phase of the reproduction reference signal is not switched but only the phase of the recorded discrimination signal is switched, and therefore the spot jumps to the rear adjacent track by the servo action. In this way, the alternative waveform of 30 Hz as shown along the ordinate in FIG. 11 is observed at the output of the phase detector. In the drawing, the abscissa represents the position of the reproduction track. The width of the pulse waveform is determined by the response constant of the servo system.

This reproduction state is not desirable. Therefore, the phase of the above-mentioned alternating waveform is compared with that of the output of the switching signal generator 56 in a timing corrector 56' which forms a part of the switching signal generator 56, but is shown separately for purposes of illustration in FIG. 9, so that an abnormal locked state is detected and the switching phase is reset and returned to the correct timing. This is the reason why the output of the phase detector 59 is connected with the timing corrector 56'.

Next, the function of the connection of the operation command panel 57 will be explained. As explained above, this is used for special reproduction of a still image or the like.

First, for performing the still reproduction, it is enough if the generation of the switching signal is stopped. By doing so, the reference four-phase signal on reproduction side maintains a single phase, and therefore as shown in FIG. 12, one track is followed automatically, thus making possible still reproduction.

Next, for the purpose of double-speed reproduction, two output pulses instead of one for the reference are produced each time from the switching signal generator circuit 56 on the instructions from the operation command panel 57. Thus, the output reference signal of the four-phase selector 55 takes the form of sin (ωt−2kπ/2). The numeral 2 included in 2kπ denotes that two pulses are generated at a time. As a result, it is seen from FIG. 13 that by the action of the reproduction servo loop, one track is jumped for each rotational period, thus making possible the mode of reproduction in double speed.

Next, in performing the reverse reference speed reproduction, the basic concept is to switch the phase of the output of the four-phase selector in the left rotational direction (as compared with the reference which is represented by the right rotation). For this purpose, the selector 55 is provided with pulse input terminals distinguishable one from the other for the right and left directions, or alternatively three pulses (=4−1) are produced from the switching signal generator within a short period of time. The response time constant of the track servo is generally about 100 μsec. Therefore, if three pulses are generated at high speed within a period sufficiently shorter than about 100 μsec, it is equivalent to generation of one leftward phase switching pulse.

It should be noted, however, that the abovementioned pulse is required to be generated about 100 μsec or more later than the reference switching timing. In other words, in the reference switching timing, as in the still reproduction, the output phase of the four-phase selector is fixed, whereby the spot is moved rearward by one track. This rearward movement ends within about 100 μsec of the response time constant of the servo system. After that, one pulse for left rotation or three high speed pulses for right rotation are applied. This makes possible the reverse reference speed of the mode shown in FIG. 14. The foregoing description concerns the reverse reference speed reproduction by delayed switching. As another mode, one pulse for left rotation or three high speed pulses for right rotation may be applied to the four-phase selector 55 in conformity with the timing of the vertical synchronizing signal present at the left position in FIG. 14. In this case, the delayed switching is not required. This concept is obviously applicable also to the double-speed reproduction.

The basic three types of special reproduction modes are described above. Though not described with reference to FIG. 1, it is well known that in the ordinary reproduction mode, the pick-up section including the lens and half mirror is moved parallelly from the disc outer periphery toward the inner periphery thereof in synchronism with the rotation of the disc motor. In the above-mentioned special reproduction mode, too, stoppage, double-speed movement and reverse movement are performed of course on the instructions from the operation command panel 57.

The prior art systems have no capability of discriminating the tracks one from another. Therefore, in performing the special reproduction mode mentioned above, a large pulse is required to be applied to an actuator in order to rapidly transfer the spot to the adjacent track while at the same time cutting off the track servo loop for a short period of time in synchronism with the vertical synchronizing signal. In that case, the distance covered by the spot is concerned with the application time of the waveform, the amplitude of the pulse and the control efficiency of the actuator. This results in variations in many respect, making stable switching operation difficult.

According to the present invention, the tracks are provided with four individual properties, so that the special reproduction mode is both simplified and stabilized as mentioned above, leading to a great advantage. Further, according to the present invention, the output of the phase detector 59 of FIG. 9 is connected, after being low-pass filtered, to the control terminal (not shown in FIG. 9) which can control the speed of parallel movement of the pick-up section, thus making up a system which is capable of automatic switching to reproduction mode. In this case, however, the residual deflection between the spot center and the desired track center is maintained at a small value. Therefore, a large DC loop gain of more than about 60 track pitches/sec in pick-up parallel moving ability is required against the residual deflection of 0.08 μm, i.e., about 10% of the high density track pitch of about 0.8 μm.

Further, high speed forward reproduction and reverse reproduction are also possible on the same operating principle. In the m-fold speed forward reproduction, for instance, m pulses are basically produced from the switching signal generator circuit 56 at a time, so that the output reference signal from the four-phase selector 55 takes the form of sin $(\omega t - mk\pi/2)$. It is, however, not desirable to apply m pulses within a time period shorter than the time constant of the track servo system. Instead, the (m−2) pulses following the first two pulses are required to be delayed at time intervals longer than the response time of the servo system.

The construction of the first embodiment of the present invention and the operation thereof was described above. A second embodiment is a modification in which the erroneous timing preventing circuit in FIG. 9 is not required. For this purpose, the outermost peripheral part of the disc lacking a track or the innermost part lacking a track is marked with a small sign such as a small hole or provided with a small magnet synchronous with the four-phase switching timing at the time of recording operation. At the time of reproduction, this mark is read for each rotational period, so that only the correct one of the two-value output pulses of the ½ frequency divider within the switching signal generator 56 is selected.

It is also of course possible to insert the switching timing information in advance in the recording information itself in the form of pits. This method is obviously conceivable in various forms in the state of art. For example, the switching timing information may be previously superposed during the vertical flyback period of a video signal and thereafter may be a modulated high frequency signal through a frequency modulator. To this end, only a pulse generator is required. In the SECAM color television system used in France, the color signal switching timing information is inserted in the vertical flyback period by the repetition of 25 Hz, and therefore this information may be used directly as a phase switching timing signal for both recording and reproduction. In this case, the ordinary concept is resorted to in which the disc rotational frequency is selected at the frame frequency of 25 Hz.

A third embodiment is a modification eliminating the need of the erroneous timing preventing circuit similarly. In such a method, an apparent eight-phase discrimination signal is used in place of the four-phase discrimination signal for each track period or frame period in FIG. 8. In other words, instead of switching the phase by $\pi/2$ radian for each frame period, the phase is switched by $\pi/4$ radian for each vertical synchronizing pulse, i.e., each field period that is half the frame period, as in the manner shown in FIG. 15.

Figure 8:
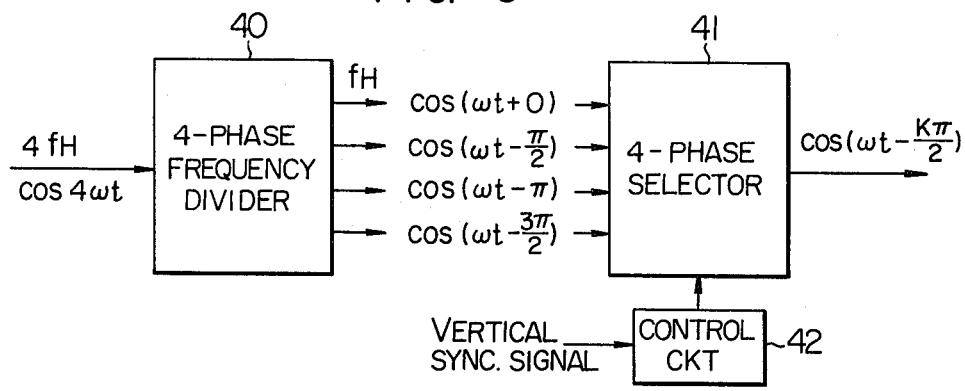
FIG. 8 is a basic block diagram showing a device for producing the discrimination signal.
Figure 16:
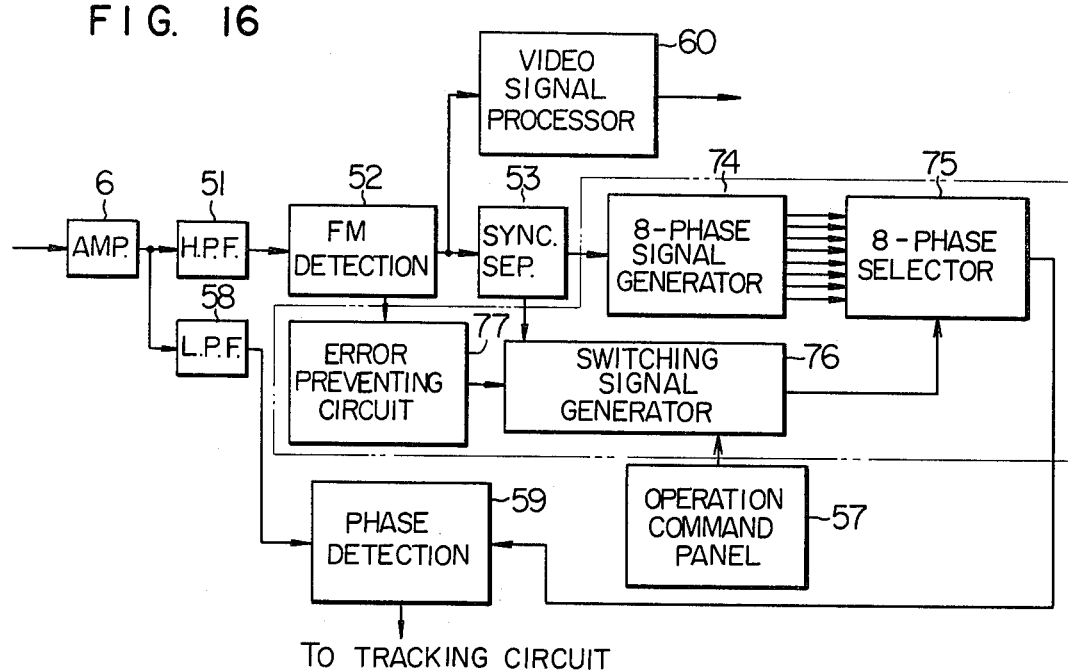
FIGS. 16 and 17 are block diagrams showing the essential parts of the reproduction system according to embodiments of the present invention, respectively.

In FIG. 15, reference numeral 70 shows an eight-phase frequency divider similar to the four-phase frequency divider 40 of FIG. 8 for producing eight output signals out of phase by $\pi/4$ radian in response to the eight-fold horizontal frequency signal. Numeral 71 shows an eight-phase selector for switching the phase in predetermined sequence in every field period in response to the output signal of the switching signal generator 72 (which may be a vertical synchronizing pulse included in the recording video information) and for producing an eight-phase discrimination signal in the form of cos $(\omega t - h\pi/4)$, where h is an integer the value of which is increased by one for each field period. If h is an odd number, it is considered that an odd-numbered field is involved; and if h is an even number, an even-numbered field is considered to be involved. Consider that such a discrimination signal is recorded on the disc. As for the even-numbered field, quite the same arrangement as explaned with reference to FIG. 5 is achieved. This is because in view of the phase difference of $\pi/4$ radian for each field, there is a difference of two fields between adjacent tracks and hence the difference of $\pi/2$ radian. Even in an odd-numbered field, this relation between adjacent tracks hold true, although the relative position with the horizontal synchronizing signal is displaced by $\pi/4$ radians. This characteristic is specific to the eight-phase discrimination signal for each field, which should be taken into consideration for reproduction. A specific configuration is shown in FIG. 16. In this drawing, those component elements different from those shown in FIG. 9 are surrounded by dotted lines, the remaining parts being operated the same way as in FIG. 9.

In FIG. 16, numeral 74 shows an eight-phase signal generator circuit for generating eight horizontal frequency signals having the phase difference of $\pi/4$ radians from each other, the output of which is the same as that of the eight-phase frequency divider in FIG. 15. This circuit, like the four-phase signal generator circuit 54, is basically easily configured by a combination of phase-shifting circuits. Numeral 75 shows an eight-phase selector for producing an eight-phase reference signal sin $(\omega t - h'\pi/4)$ of the same type as the eight-phase discrimination signal, where h' is an integer the value of which is increased one by one in accordance with the number of the pulse input from the switching signal generator 76. The main objective of the switching signal generator 76 is to utilize the vertical synchronizing pulse from the synchronizing signal separator circit 53 directly as a phase switching pulse. In this case, there is no problem of two values of the frequency divider as encountered in the first embodiment, but whether the rotational phase of the disc corresponds to an even- or odd-numbered field poses a problem, resulting in the problem of an erroneous timing. The error preventing circuit 77 described later has the function to utilize the information of the FM demodulator 52 in order to correct and reset such an error.

The low-pass filter 58 produces a low-frequency eight-phase discrimination signal as already mentioned, which takes the form of cos $(\omega t - h\pi/4 - \Delta\theta)$, where h is a field number, and $\Delta\theta$ is the phase deviation occurring in accordance with the degree to which the spot center leads the desired track. This output and the eight-phase reference signal sin $(\omega t - h'\pi/4)$ which is the output of the eight-phase selector are detected in phase. The output of the phase detector takes the form of $$\frac{1}{2} \times \sin\left(\frac{h'-h}{4}\pi + \Delta\theta\right)$$

from the process identical to that of explanation for the first embodiment. If h'−h is an even number, [(h'−h)/2]×π/2 in the parenthesis is an integral multiple of π/2. Therefore, if (h'−h)/2 divided by 4 is 0, 1, 2 or 3, pull-in occurs into the desired track, a forward adjacent track, a second adjacent track or a rear adjacent track respectively, and after the pull-in, only the center of the particular track is consistently followed, thus posing no problem. This phenomenon also occurs with the first embodiment in the case where the value k in the discrimination signal is different from the value k in the reference signal under the initial conditions.

If the value h'−h is an odd number, on the other hand, it is estimated that the spot center after pull-in will follow the bottom between adjacent tracks. In this case, a very large crosstalk occurs between tracks. However, if the same information happens to be carried on the adjacent tracks and the FM carriers thereof are in phase with each other, a video signal is read out normally. This condition, however, fails to last long, but the FM carriers may become opposite in phase, in which case the output of the synthesized FM carrier is reduced substantially to zero. The method for detecting this attenuation is well known as what is called the drop-out detection in VTR field where the shortage of the envelope amplitude of the reproduced FM wave is detected. The above-described error preventing device 77 is for detecting this attenuation and resetting or producing one more pulse of the switching signal generator section 76, thus establishing the correct initial conditions. In order to reduce the frequency of this operation and prevent the erroneous operation, it is necessary to select a sufficiently large time constant for detection of the amplitude attenuation of FM wave.

Now, the explanation of the third embodiment is over. A fourth embodiment which is a modification related to selection of the frequency of the discrimination signal will be described below.

In the above-mentioned embodiment, the discrimination signal of the same frequency as that of the horizontal synchronizing signal is used. Instead, the frequency of the discrimination signal may be an integral multiple of that of the horizontal synchronizing frequency. In that case, the frequency of the multiphase reference signal on the reproduction side is set at the same integral multiple as that on the recording side.

Next, explanation will be made of a fifth embodiment relating to a modification of the phase number. In the above-described embodiments, adjacent tracks have the phase difference of 2π/4 radians. Generally, by providing the phase difference of 2π/m radians, it is possible to attain m phases, where m is a positive integer. In this case, the discrimination logic function corresponding to FIG. 7 is a periodic function of m track pitch. When m=1, it is the same as the conventional system. When m=2, on the other hand, it is impossible to discriminate the right side from left side and it is necessary to use the well-known wobbling technique at the same time. In view of the fact that the period of the discrimination logic function is two track pitches, however, the system stands the high-density recording. When m is three or more, the right and left displacement of the track is capable of being discriminated, thus making possible modification to each of the above-mentioned embodiments. If the value m is increased excessively, the phase discriminating sensitivity against a predetermined amount of track displacement is reduced undesirably.

A sixth embodiment concerns the case in which the rotational frequency of the disc is P times the field frequency of 60 Hz. If P is ½, the above-mentioned embodiments apply. If P=1, the above-described error preventing circuit is not required. If P is an integer of 2 or more, the phase is switched P times within one field period. The switching is made in a predetermined format with reference to the vertical synchronizing signal and carried out at predetermined cycles of horizontal synchronizing signals. The recording is made according to this rule, and in reproduction, the reference phase is switched according to the same rule with reference to the reproduction vertical synchronizing signal. If P is one divided by an integer ⅓ or less, P vertical synchronizing signals are included in one rotational period, and therefore the same format as the third embodiment above is applicable. In other words, in the case of the fundamental configuration of the four phases for track period, recording is conducted as a discrimination signal for each field of 4×P phase, and in reproduction, a reference signal of 4×P phases is also generated. As an alternative, according to the first embodiment, recording is made simply as a four-phase discrimination signal and at the time of reproduction, a four-phase reference signal is generated. For correcting a timing error, the 1/P frequency divider included in the switching signal generator circuit 56 of FIG. 9 is reset in response to the alternating pulse information in the phase detection output in the manner similar to that mentioned with reference to FIG. 11.

A seventh embodiment will be described. In the block diagram of FIG. 9 showing the reproduction section, instead of producing a four-phase reference signal from the horizontal synchronizing signal by means of the four-phase signal generator circuit 54 and the four-phase selector 55, a continuous wave of fixed phase may be produced by subjecting the four-phase discrimination signal obtained as an output of the low-pass filter 58, to a conversion reverse to the production of four phases for recording. In that case, it is required that the four-phase signal generator circuit 54 and the four-phase selector of FIG. 9 be inserted again between the low-pass filter 58 and the phase detector 59, and that the four-phase selector 55 be set at the left direction of phase switching as compared with the right direction for recording.

Figure 17:
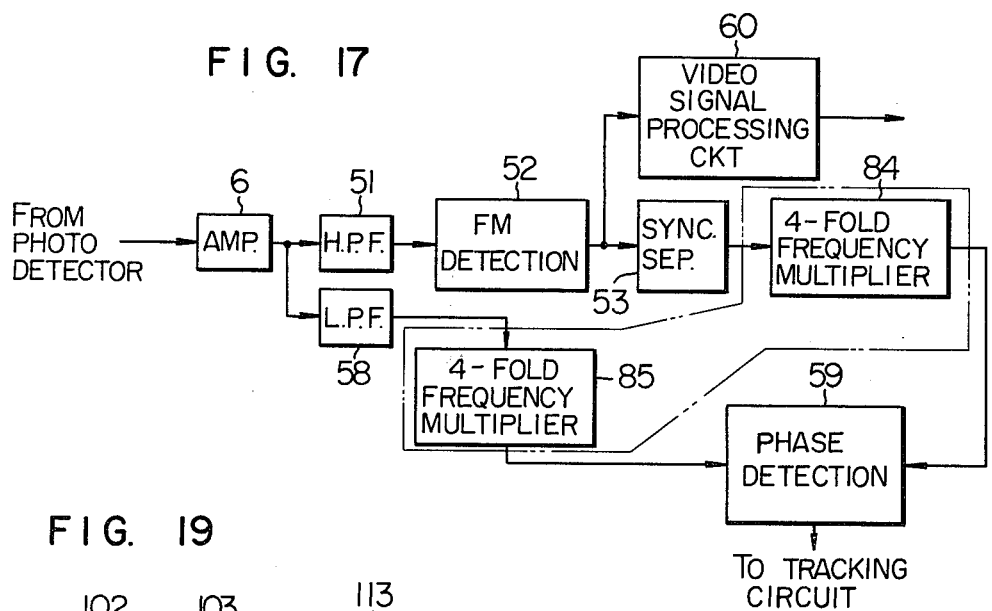

Next, an eighth embodiment will be described. In the above-mentioned embodiments, the input frequency of the phase detector 59 for reproduction (FIG. 9) is required to be identical to the frequency of the discrimination signal. This may be modified into a simpler form by comparing frequencies four (an integer) times larger. For instance, the phase detection in the first embodiment of FIG. 9 is performed in the frequency range four times larger than the horizontal frequency as shown in FIG. 17. In this drawing, the difference from FIG. 9 lies in the part surrounded by dotted lines. Numeral 84 shows a four-fold frequency multiplier for the horizontal synchronizing pulse, which produces a reference phase signal of sin 4ωt. On the other hand, numeral 85 shows a four-fold frequency multiplier for the discrimination signal which produces an output signal of cos (4ωt−4Δθ). Thus the output of the phase detector 59 takes the form of ½ sin (4Δθ). The value Δθ changes by ±π/4 radians in accordance with the displacement of the spot center from the center of the desired track center to the bottom between adjacent tracks, as seen from the graph of the discrimination logic function. As a result, 4Δθ varies by ±π radians. In other words, as a result of the phase deviation being enlarged four times, the sensitivity of detection of a track position error is improved by four times. Further, the four-phase reference signal switching circuit and the like required in FIG. 9 are not required any longer. Unfortunately, however, it is difficult to realize the special reproduction functions such as still reproduction easily. Nevertheless, this embodiment has the advantage thereof applicable to the fields other than video disc such as audio PCM disc.

A ninth embodiment of the invention concerns a modification of a waveform of the reproduction reference phase signal. The reproduction reference phase signal which is a sine wave in the embodiments mentioned above may be replaced by a rectangular wave. Also, it may of course take the form of pulses with a small interval having the four-phase timing. According to the semiconductor integrated circuitry techniques in recent years, the pulse form is more easy to realize. Further, the reproduction discrimination signal may be shaped into rectangular form by the limiter prior to phase detection. Also, the waveform of the four-phase discrimination signal on the recording side may be produced as a rectangular or pulse form from the beginning.

A tenth embodiment involves a modification for reducing the time proportion of the four-phase discrimination signal on the recording side. The idea is to avoid insertion of an additional discrimination signal or the like as far as possible during the image transmission in horizontal period, thus transmitting the discrimination signal in compressed form during the flyback period.

Figure 18:
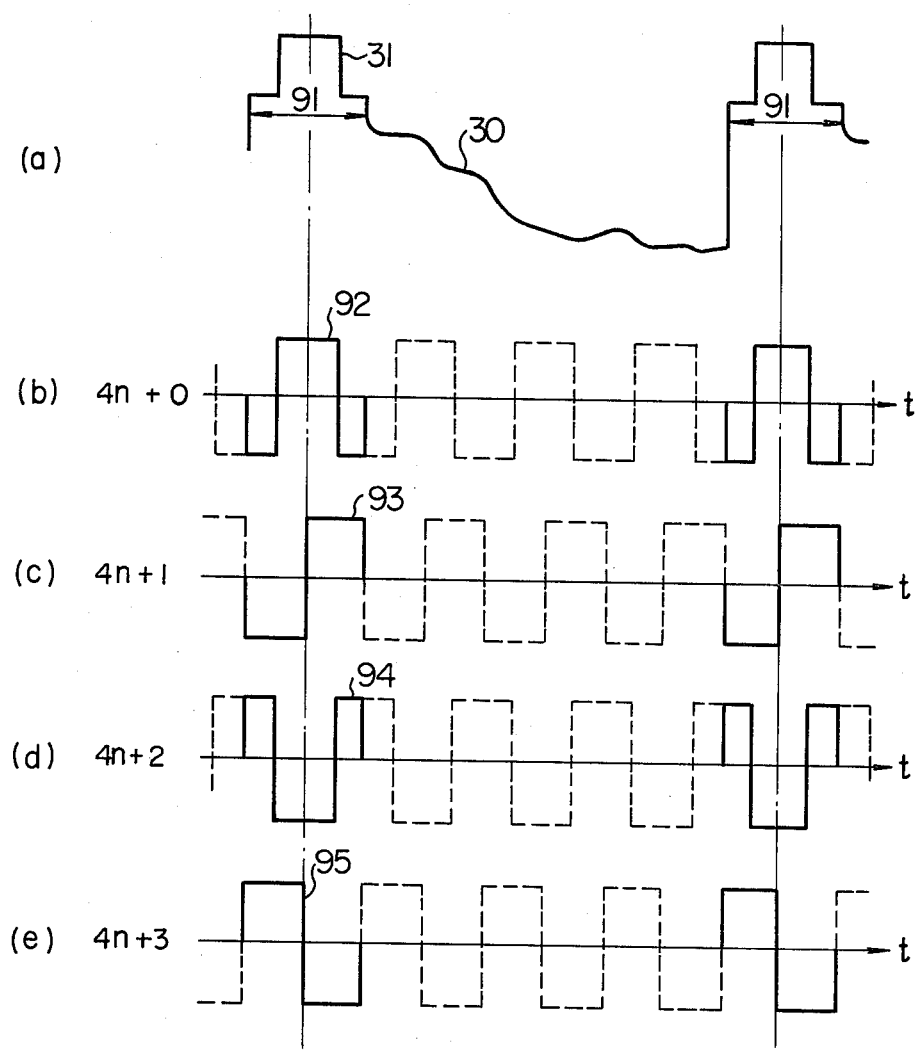
FIG. 18 is a diagram showing waveforms of another example of the discrimination signal.

FIG. 18 shows a waveform of the recording discrimination signal for that purpose. In FIG. 18(a), numeral 30 shows a video signal, numeral 31, a horizontal synchronizing signal, numeral 91 a horizontal flyback period, and numerals 92 to 95 in FIGS. 18(b) to (e) show four-phsae discrimination signals. As compared with the fundamental embodiment of FIG. 5, the frequency of the discrimination signal is increased (as mentioned with reference to the fourth embodiment), the waveform takes a rectangular form (as mentioned with reference to the ninth embodiment), and only the horizontal flyback period is used as a discrimination signal by gating. The difference of this embodiment from the above-mentioned art lies only in the gating system for the horizontal flyback period. This system may be easily added to the recording and reproduction system by the ordinary pulse techniques. In this case, since the time proportion of the discrimination signal is small, it is effective to increase the amount of superposition of the discrimination signal of FIG. 4 to about 30% of the amplitude of the high frequency signal in order to compensate for such a small time proportion.

In this embodiment, the discrimination signal is not necessarily produced by gating the signal having a phase continuous to time, but may take a four-phase pulse train triggered by the front porch of the horizontal synchronizing signal.

An eleventh embodiment concerns a modification in which the phase of the discrimination signal is switched not intermittently for each track period but for each horizontal period. Generally, one rotational period is set at one image frame, which is 525 (odd number) times the horizontal period. Therefore, if the phase of the discrimination signal is switched by π/2 radians for each horizontal period, the phase difference of ±π/2 radians may be attained between adjacent tracks. This construction is capable of being realized in such a manner that in FIGS. 8 and 9, the phase-switching pulse from the control circuit 42 and the switching signal generator circuit 56 are generated for each horizontal period.

A twelfth embodiment presents a modification in which the phase of the discrimination signal in the 11th embodiment is switched continuously instead of intermittently. For this purpose, the relation specified below is required to be established, $$fD = (n + \tfrac{1}{4})fH$$

where fD is the frequency of the discrimination signal, fH the horizontal frequency and n an integer. By doing so, the phase switching circuit required on the recording side in the foregoing embodiments is not required, except for the PLL (phase lock loop) circuit for generating a discrimination signal frequency from the horizontal frequency. To attain this object, it is well known that the PLL type (4n+1)-fold frequency multiplier be connected in cascade with the ¼ frequency divider to obtain the component of fD frequency.

On the reproduction side, too, the blocks including the four-phase signal generator circuit 54, the four-phase selector 55 and the switching signal generator 56 of FIG. 9 may be replaced with equal effect by a circuit for generating fD from the horizontal synchronizing signal frequency fH as on the recoridng side. In this case, too, a four-phase discrimination signal is produced in advance which is appropriately switched in accordance with the special reproduction mode in order to provide a special reproduction function including the still reproduction.

Next, a 13th embodiment will be described, which is a modification in which the discrimination signal of the 12th embodiment is also used as a subcarrier for compensation of the jitter in the video disc player.

One of the signal types for the video disc player concerns the well-known technique for multiple frequency recording through duty factor modulation of the pit shown in FIG. 4, under the frequency band occupied by the FM high frequency by low-pass conversion of the color signal information as in the home VTR. In this case, a continuous wave of several hundred KHz called a pilot carrier is used as an information source to compensate for the jitter, i.e., the instability along the time axis due to the eccentricity of the disc. In order to avoid the beat due to the interference with the video signal, the frequency of the pilot carrier is usually set at an integral multiple plus one fourth of the horizontal frequency. Therefore, it may be used in common with the track discrimination signal according to the present invention.

A modification of the concept of the phase difference will be described below as a 14th embodiment of the present invention. In the above-mentioned embodiments, the synchronous phase of the image is displaced from the phase of the discrimination signal by ±¼ radian between adjacent tracks. For the purpose of this invention, however, it suffices if the phase of the discrimination signal has a predetermined difference between adjacent tracks. It is only necessary to provide a predetermined phase difference of the discrimination signal for each disc rotational period. At the time of reproduction, the correct phase of the discrimination signal is read by some means.

As a result, the relation $TM=(n+\frac{1}{4})TD$ is required, where TM is the disc rotational period, TD the period of the discrimination signal, and n an integer. Instead of $n+\frac{1}{4}$, either $n+\frac{1}{3}$, $n+1/5$ or so on may be used as described above. In reading the correct phase of the discrimination signal for reproduction, the rotational phase of the disc motor may be frequency-multiplied if the eccentricity of the disc is small. Generally, however, the disc eccentricity is large and the instability along the time axis is another factor to be considered, so that the frequency multiplication of the rotational phase alone is not satisfactory, and the recording synchronizing signal information is used as a more correct information. Another possible modification to meet this requirement is such that the discrimination signal phase is made to coincide exactly with the phase of the synchronizing signal and the rotational period is displaced according to the above-mentioned formula. For instance, the period of one rotation for recording is made equal to $(525+\frac{1}{4})$ lines of horizontal scanning period.

In this case, the four-phase signal generator circuit 54, the four-phase selector 55 and the switching signal generator 56 of FIG. 9 for the reproduction section are not required, although the still reproduction is difficult.

A 15th embodiment concerns a method for improving the synchronizing stability on the reproduction side applicable to the embodiments other than the 14th embodiment. It is seen from the foregoing description that the method for detecting a track position error under consideration is based on the assumption that the reproduction reference phase signal has information of a correct phase of the discrimination signal. This in turn is based on the assumption that the horizontal scanning signal is read correctly, which requires that the FM high frequency signal carrying information at the synchronizing signal section has a sufficiently large amplitude in being read out by the reproduction pickup. The correct reading is desirable therefore even if the spot center is positioned at the bottom between tracks in displaced relation from the track center. Generally, the instantaneous frequency, but not the instantaneous phase, of the FM carrier wave is determined by a corresponding modulation information (the synchronizing signal in this case). The instantaneous phase is given as an integrated value of the past modulation information. Therefore the adjacent tracks may have opposite phases of carrier wave. In this case, the synchronizing signal disappears at the bottom between tracks, thus making impossible the correct discrimination. An effective measure to overcome this problem is a phase coincidence of FM carrier.

In other words, the initial in-phase state of the FM carrier is achieved at each beginning of the horizontal flyback periods and each vertical flyback periods in advance in recording operation. For this purpose, independently of the variable frequency oscillator making up a part of the FM modulator, it is necessary to provide a stable oscillator in phase with the horizontal frequency which is an integral multiple. Also, the frequency of the oscillator is set at a level (about 8 MHz) equivalent to the pedestal level of the FM carrier, so that the output of the fixed phase oscillator is injected into the FM modulation oscillator for phase coincidence at each beginning of the horizontal flyback periods and vertical flyback periods.

A 16th embodiment involves an application to other than an optical type video disc player. This embodiment is appllicable as a high density recording-reproduction technique for the optical type PCM audio disc player. In that case, however, the image synchronizing signal described with reference to the above-mentioned embodiments is replaced by a sampling synchronizing signal. The frequency of the sampling synchronizing signal is in most cases set at about 47 KHz, and therefore the 11th and 12th embodiments of this invention are applicable directly. However, the special reproduction functions such as still reproduction are not required for audio purposes.

Each of the above-mentioned embodiments is effectively applied to other than the optical system as a tracking error detection method in a system for performing recording and reproduction through the information surface made up of a multiplicity of mutually adjacent high density tracks.

In the embodiments explained above, a method is used wherein signals of a different phases are used as a tracking error discrimination signal. Next, explanation will be made of the second fundamental embodiment using a different frequencies for each track as a discrimination signal. In the description that follows, reference will be made to a video disc for recording a video signal of four fields for each rotation of the disc.

Figure 19:
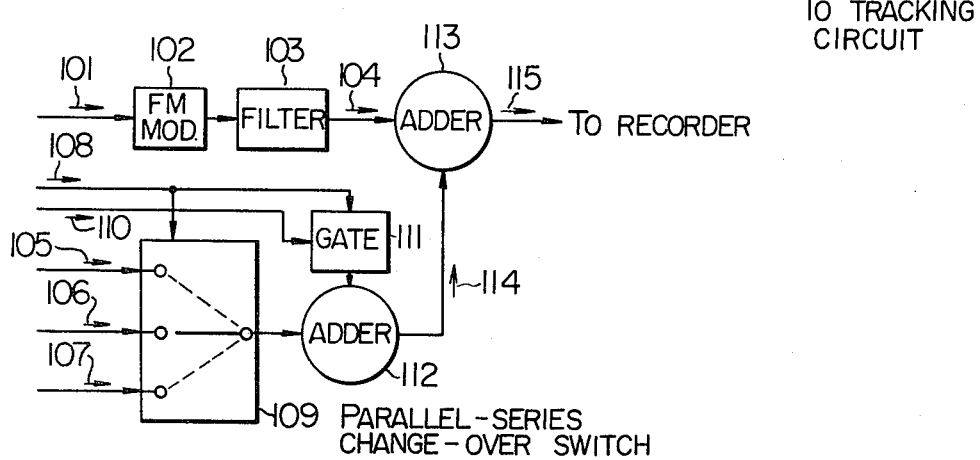
FIG. 19 is a fundamental block diagram showing the recording apparatus according to a second fundamental embodiment of the present invention.

The process of forming such a recording signal is shown in FIG. 19. In this drawing, numeral 101 shows a main information signal for the video or the like, numeral 102 an FM modulator, and numeral 103 an unrequired wave-blocking filter for removing the unrequired waves from the input high frequency FM signal with the energy (generally distributed over 4 MHz). The frequency band to be removed is set in such a manner as to remove the unnecessary waves in the low frequency band included in the pilot signal described below. Numeral 104 shows an FM signal. Numerals 105 to 107 show the 0-th, first and second pilot signals for tracking which are allotted with the different frequencies $f_0$, $f_1$ and $f_2$ in the region lower than the high frequency FM signal frequency band mentioned above. In a typical example, $f_0$ is about 600 KHz, $f_1$ is about 800 KHz, and $f_2$ is about 1 MHz. Numeral 108 shows a switching pulse generated at the rate of one for each disc rotation, which pulse is obtained either by detection of the disc rotational phase or frequency division of the synchronizing signal in the main information signal. Specifically, it is obtainable by $\frac{1}{4}$ frequency division of the vertical field synchronizing signal. For application to the NTSC system, this signal takes the form of pulse with the basic frequency of 15 Hz, and for application to PAL or SECAM system, it takes the form of a pulse signal with the frequency of 12.5 Hz.

Figure 20:
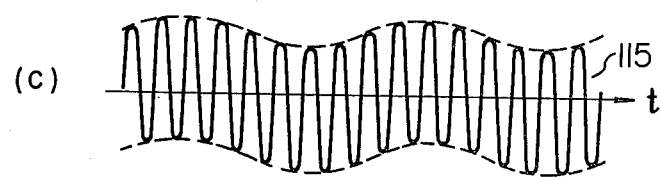
FIG. 20 is a diagram showing waveforms produced at the essential parts of the circuit shown in FIG. 19.
Figure 21:
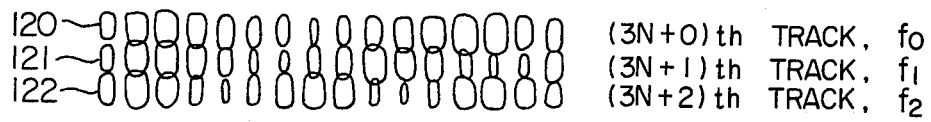
FIG. 21 is a plan view showing an example of the recording pit array.
Figure 22:
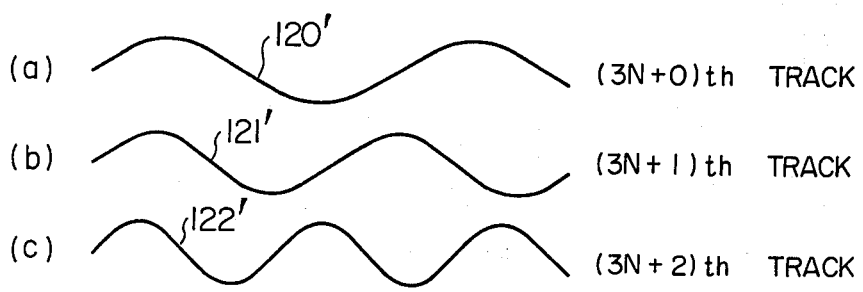
FIG. 22 is a diagram showing waveforms of a pilot signal corresponding to FIG. 21.

The parallel-series change-over switch 109 is for taking out at the output thereof each of the above-mentioned three pilot signals sequentially for each disc rotational period, and the switching timing is taken at the rise portion of the input switching pulse 108. A specific configuration of the switch under consideration is not the main point of this invention but is realizable in various forms by the conventional methods including the use of an IC for the semiconductor analog switches available on the market (such as RCA's CD-4066). The output signal frequencies of the present switch are adapted to be arranged in time sequence into $f_0$, $f_1$, $f_2$, $f_0$, $f_1$, $f_2$, and so on. Numeral 110 shows a timing pilot signal allotted with a low frequency $f_3$ different from the frequencies $f_0$, $f_1$ and $f_2$ (a typical example being $f_3 \approx 200$ KHz). This timing pilot signal 110 is allowed to pass the gate circuit 111 and applied to the adder 112 only during a high-potential period of the switching pulse 108. This gating period is set within the vertical flyback period of the image. The adder 112 produces a synthesized pilot signal 114, which is added to the FM signal 104 by the adder 113, thus producing a synthesized FM output signal 115. The waveforms produced at the main parts of the circuit of FIG. 19 are shown in FIGS. 20(a) to (c), in which like numerals denote like waveforms in FIG. 19. FIG. 20(a) shows a high frequency FM signal 104, (b) a low-frequency synthesized pilot signal 114, and (c) an added synthesized FM output signal 115. This output signal 115 is applied to a recorder for demodulating the intensity of a recording light or electron beam or the displacement of a cutter head by a well-known method and thus recorded in the form of a spiral pit array on the master disc. FIG. 21 shows an enlarged view of part of the pit array. The drawing under consideration includes the 3N-th track to (3N+2)th track (N: a natural number) as counted from the outer periphery, each corresponding to the pilot signal waveforms shown in FIGS. 22(a) to (c) respectively. This indicates that the 0-th pilot frequency $f_0$ is recorded in the 3N-th track, the first pilot frequency $f_1$ in the (3N+1)th track, the second pilot frequency $f_2$ in the (3N+2)th track, and so forth. In the above explanation of the pit array and waveforms, the timing pilot signal is not described. Since this signal is recorded only in part of each disc rotational period as mentioned already, it appears in a form recorded along a single radius on the disc.

The explanation of the recording process is over. Next, the manner in which the tracking is discriminated in the process of reproduction will be explained.

Figure 23:
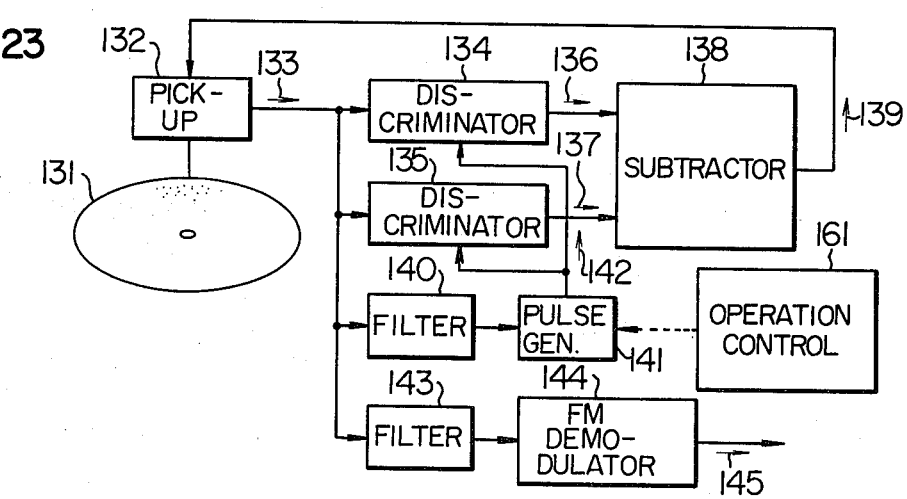
FIG. 23 is a fundamental block diagram showing a reproduction apparatus according to a second fundamental embodiment of the present invention.

FIG. 23 is a block diagram showing the reproduction process. In this embodiment, explanation will be made with reference to a player in which the recording pit is detected in the form of variations in electrostatic capacity with a stylus having a small electrode. In the drawing, numeral 131 shows a disc which is driven at the speed of 15 Hz or 12.5 Hz by a motor not shown. Numeral 132 shows an electrostatic pick-up having a tracking servo actuator. The conductor provided at the forward end of the reproduction stylus of this pick-up has a lateral width substantially equal to the track width (about 1 to 2 $\mu$m) in FIG. 21. Numeral 133 shows a synthetic FM signal detected by the pick-up. Numeral 143 shows an FM filter for removing the low-frequency pilot signal from the synthetic FM signal. Numeral 144 shows an FM demodulator, and numeral 145 an output main information signal. Numerals 134 and 135 show lag and lead discriminators respectively described later, and numerals 136 and 137 lag and lead signals produced by the discriminators 134 and 135 respectively. Numeral 138 shows a subtractor, the output of which makes up lag/lead discriminating servo signal 139. This servo signal 139 is returned to the track actuator of the pick-up 132 for negative feedback control by the well-known technique. Numeral 140 shows a filter for detecting the timing pilot signal frequency $f_3$, which filter produces a waveform with the envelope thereof amplitude-modulated in response to the switching pulse 108 described with reference to FIG. 19. The operation control section 161 is used for special reproduction such as still reproduction, and the operation thereof will be explained later.

Figure 24:
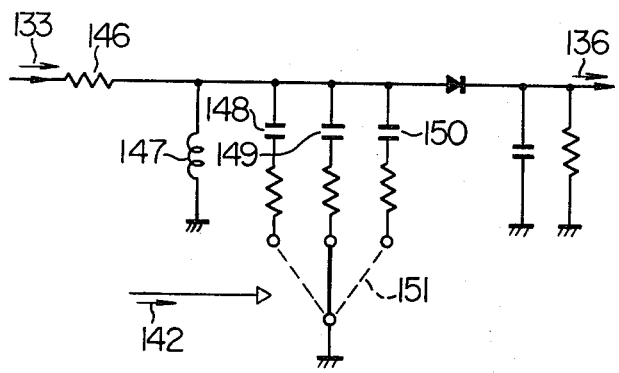
FIG. 24 is a circuit diagram showing a specific example of the discrimination circuit.

Next, an example of a specific configuration of the lag signal discriminator 134 is shown in FIG. 24. In this drawing, like numerals as in FIG. 23 denote like component elements. The synthetic FM signal 133 is converted into a current source by the resistor 146 and then applied to a switch control filter including an inductor 147 and capacitors 148, 149 and 150. The output envelope of the filter is detected by a diode thereby to make up a lag signal. The capacitor 148 together with the inductor f147 makes up a parallel resonance circuit adapted to be resonated to the 0-th pilot frequency $f_0$. In similar fashion, the capacitors 149 and 150 make up parallel resonance circuits respectively adapted for resonation to $f_1$ and $f_2$ together with the inductor 147. The Q value of each filter is sufficiently high so that the fi filter is able to dampen the pilot signals other than fi well. The series resistor for each capacitor is for equalizing the tuning impedance level of each parallel resonance circuit thereby to absorb the gain difference. Numeral 151 shows a change-over switch for switching the resonant frequency of the filters in predetermined sequence each time the rise portion of the timing pulse 142 is generated. The lead signal discriminator 135 in FIG. 23 has substantially the same configuration as that in FIG. 24, although the operation of the switches must be interlocked in consideration of the sequence of lag or lead. For this purpose, the capacitors making up the filter in the lead discriminator, which are not shown and designated as 148', 149' and 150' respectively, are set at the resonant frequencies of $f_2$, $f_0$ and $f_1$ respectively. By doing so, the rest is switching the capacitors from 148 (148'), 149 (149'), 150 (150'), 148 (148'), 149 (149'), 150 (150') and so on, in that order for both lag and lead purposes. This is for the reason that if the pick-up is reproducing the (3N+1)th track in the beginning, it is seen from FIG. 21 that the present track is recording the pilot frequency $f_1$, the rear adjacent track the pilot frequency $f_0$, and the forward adjacent track the pilot frequency $f_2$. Thus, the capacitor combination of 148 (148') is required to be activated. Upon detection of a timing pulse after a further rotation of the disc, it is seen from FIG. 21 that the track numbers of the rear adjacent, present and forward adjacent tracks are 3N+1, 3N+2 and 3N+3 respectively, in accordance to which pilot frequencies of $f_1$, $f_2$ and $f_0$ are realized. Thus the capacitor 149 (149') is required to be activated. A similar process is repeated subsequently.

In this way, the discriminators 134 and 135 of FIG. 23 always produce proper lag and lead information. When the stylus of the pick-up is scanning the center of the desired track, neither the lag nor lead signal is substantially detected, and therefore the output servo signal of the subtractor in FIG. 23 is balanced. When the stylus is delayed behind the desired track and sided to the outer periphery of the disc, on the other hand, the lag information in the form of servo signal is generated substantially in proportion to the amount of stylus deflection. In the case where the stylus is advanced from the desired track and deflected toward the inner periphery of the disc, by contrast, the lead information in the form of servo signal of opposite polarity is generated substantially in proportion to the amount of stylus deflection. As a result, a proper servo signal 139 is always produced continuously from the subtractor 138, thus achieving the right tracking by the well-known servo techniques. The relation between the track residual deflection and the detection servo signal, i.e., the discrimination logic characteristics are shown by dotted line in FIG. 25. In this drawing, the abscissa represents the amount of track deflection in the form of number difference with reference to the desired track, and the ordinate the detection servo signal. As will be seen from this graph, within the range of track deflection of ±1 track, a substantially proportional detection signal is obtained, thus leading to a triangular wave-like periodic function for each three track periods from the macroscopic point of view.

In the conventional tracking systems for a grooved disc, generation of an even instantaneous track deflection of more than 0.5 track causes an immediate jump to another track, often disrupting the continuity of the information reproduction. According to the present invention, on the other hand, a track deflection of up to ±1.5 tracks is expected to be restored to the original correct state by the servo system, with the result that a continuous and stable reproduction of information is made possible. Moreover, a conspicuous feature of this invention in application to the video disc lies in the ease with which the special reproduction functions such as still reproduction are performed as described below.

First, in the still reproduction, the only requirement is to stop the generation of the output timing pulse 142 from the pulse generator 141 upon the command from the operation cotnrol section 161 of FIG. 23. Though not indicated in the drawing, the pick-up feed system is of course stopped. In this way, even if the timing pilot signal is detected upon disc rotation, the discrimination logic of the discriminators 134 and 135 remains unchanged. Under this condition, as clear from the discrimination logic characteristics shown in FIG. 25, it is impossible to continue the scanning of the track of the next number along the spiral track. Conversely, the restitutive servo force with an obvious polarity is exerted for return to the original track, thus easily realizing the still reproduction. Though not explained in detail above, the prior art using a disc without any groove requires the process of applying to the tracking actuator from an external source a pulse acting at least in the electrical direction of restitutive polarity if the still reproduction is to be realized.

According to this invention, such a process is eliminated and thus a more stable still reproduction function is achieved.

In the slow-motion reproduction such as at the speed of ¼, the generation of the timing pulse is not completely stopped in FIG. 23, but only a timing pulse is generated each time four timing pilot signals are detected.

For this purpose, the pulse generator 141 is provided with the ¼ frequency dividing function, which is actuated by the command from the operation control section 161, thus easily achieving the above-mentioned generation of a timing pulse for each four timing pilot pulses. Generally, the slow motion reproduction is also attained in similar fashion at the speed of 1/M where M is an integer. In the reproduction at four-fold speed, on other hand, the timing pulse is quadruplicated and applied to the discriminators 134 and 135. In quadruplication, either the well-known phase locked loop technique is used or the vertical synchronizing signal in place of the timing pulse is applied to the discriminators 134 and 135 in view of the fact that one rotational period of the disc corresponds to four video fields in this embodiment. Though not shown in FIG. 23, the vertical synchronizing signal is capable of being generated from the output main information signal 145 by the well-known synchronizing signal separator circuit in TV techniques.

Explanation will be made below of another method for achieving the four-fold speed reproduction without using the frequency multiplier circuit based on PLL techniques.

In FIG. 23, the timing pulse for reproduction at normal speed is assumed to take the waveform of four-field period as shown in FIG. 26(*a*). In FIG. 26(*b*), the waveform 173 concerns the four-fold frequency pulse. The waveform of FIG. 26(*c*) represents an alternative one. The alternative waveform 173 includes four pulses generated collectively in one vertical flyback period. Unlike the normal speed reproduction, three successive jumps are made to forward tracks to achieve the four-fold speed reproduction, as seen from a model shown on the disc in FIG. 27. In this drawing, the track interval is widened larger than normal for facilitating the understanding. The thin spiral line T1 shows a track of normal route, and the thick line T2 a four-fold speed alternative track. The dotted line represents the recording section for the timing pilot signal. The last three of the four pulses are produced at intervals not less than about 60 μsec. If the intervals are less than this, the following speed limit of the tracking servo system is generally exceeded. If the intervals are too long, on the other hand, the vertical flyback period of about 1 msec is exceeded, so that a track jump occurs in the video signal transmission period, undesirably resulting in a noise bar on the reproduced image. The foregoing is the description about the forward reproduction. Next, the reverse motion reproduction will be described.

For reverse motion reproduction, it is required to cause a track jump in the reverse direction from the still condition. For this purpose, two close timing pulses are applied to the discriminators 134 and 135 of FIG. 23. The interval between the two pulses is set sufficiently short as compared with the limit of the following speed of the tracking servo system. The result is that instead of the stylus being advanced two tracks forward, the stylus is attracted rearward by one track effectively by the servo system. This will be obvious from the fact that the above-mentioned track discrimination logic characteristics have a period of three tracks as explained with reference to FIG. 25. Instead of application of two close pulses, it is of course possible to construct a circuit, though a little more complicated, in such a manner that the change-over switch of FIG. 24 is operated in the reverse order.

By combination of the above-mentioned fundamental techniques, a wide variety of increased and decreased speeds in both directions are obviously possible in reproduction in accordance with the application involved. In still condition, the frame-by-frame image reproduction is easily attained by generating a switching pulse intermittently by manual operation.

In the foregoing description, reference is not made to the feed speed of the pick-up feed system. The feed speed must of course be changed in the interlocked relation with the command from the operation control section 161 of FIG. 23. An effective method for achieving this object is to employ a DC motor as a pick-up feed motor capable of being speed controlled continuously in both forward and reverse directions and to control the same motor with the servo signal 139 shown in FIG. 23. This configuration easily realizes a wide variety of special reproduction modes including still reproduction by the function of the continuous pick-up feed servo system.

The present invention is also applicable to the well-known random access function in the conventional video disc field. As is well known, the disc to which the random access is applied is marked with a serial number of binary code superimposed on the video signal at predetermined position during the vertical flyback period for each track. In some cases, this binary code is recorded in the low-frequency region as the pilot signal described in the embodiment under consideration. Anyway, this binary code signal, though not described with reference to FIG. 23, is based on the timing information which in turn is derived from the vertical synchronizing signal in the reproduction system, and used for indication of the disc reproduction position and access servo as well known. During the access servo operation, the timing pulse generator 141 of FIG. 23 according to the invention is cut off, i.e., the still reproduction state is maintained, so that the pick-up is fed forcibly on the basis of the result of lead-lag comparison between the target access number and the reproduction track number. In the meantime, the discrimination logic characteristics of the discriminators 134 and 135 are maintained in the logic state for holding the track of the target number or the number equal to the remainder after dividing the target number by three. This calculation operation may be performed also by combination of some logic circuits.

The second embodiment of the invention was described above. Modifications of the second fundamental embodiment will be described below.

(1) In the second fundamental embodiment, the 0-th to second pilot signals are referred to as continuous signals in terms of time. In actual application, however, a crosstalk may occur between the video signal and the pilot signal due to the non-linearity included in the recording and/or reproduction systems. This inconvenience is effectively avoided by inserting the 0-th to second pilot signals only during the video flyback period. For this purpose, a gate circuit for the horizontal or composite synchronizing signal is inserted between the output of the switch 109 and the adder 112 in FIG. 19. In other words, the pilot signal is recorded only during the synchronizing signal period. By doing so, the crosstalk is avoided, thus making possible a superior reproduction of a video signal with substantially no beat interference.

At the same time, the reproduction side is so constructed that a gate circuit for the synchronizing signal is added to the input section of the discriminator circuits 134 and 135 of FIG. 23, so that the crosstalk from the video signal to the pilot signal is avoided, thereby making possible superior detection of the tracking servo signal. The synchronizing signal for the gate is easily obtained from the reproduction main information signal 145 by the well-known synchronizing signal separator circuit techniques. The insertion of the gate circuit, though not an essential requirement for tracking, provides an effective aid.

When it is required in the business application to maintain the crosstalk of the main information signal from adjacent tracks at an especially low level, it is effective to lessen the lateral width of the information pit in FIG. 21, thereby providing some guard band between adjacent tracks. However, this makes it difficult to detect the pilot signal from the adjacent tracks for tracking on the reproduction side. An effective method for overcoming this problem is to enlarge the lateral width of the recording pit only during the recording period of the 0-th to 2nd pilot signals, i.e., during the synchronizing signal period. This is achieved effectively by enlarging the average density of beams only during the synchronizing signal period in laser beam recording or electron beam recording. In this way, both the width and length of the recording pit are enlarged, thus achieving the object. Also when a cutting head is used, a deeper cutting than normal is effectively performed only during the synchronizing signal period. Specifically, the conventional recording machine need not be changed but a positive bias in pulse form is added to the output of the switch 109 or the synthesized FM signal output 115 in FIG. 19 only during the synchronizing signal period. This method is more effective if the pulse amplitude is set at about the amplitude O-P of the pilot signal.

(2) In the configuration of the second fundamental embodiment, the timing pilot signal is used. This is, however, is not an indispensable requirement. A method in which no timing signal is used is described below.

For the purpose of recording, a pulse frequency-divided to ¼ of the video vertical synchronizing signal is used as a switching pulse in FIG. 19. The timing pilot signal, however, is not recorded. On the reproduction side, the timing pilot filter 140 used in FIG. 23 is not required. Instead, the vertical synchronizing signal is separated from the main information signal 145 and applied through a ¼ frequency divider circuit with a reset terminal (not shown) thereby producing a timing pulse. As well known, the output of the ¼ frequency divider circuit takes a form of a four-valued function, and so in its direct form, the probability of proper timing for recording is ¼. If it is possible to detect an abnormality of a reproduction operation in wrong timing, the right timing is restored by resetting the ¼ frequency divider. The abnormality is detected in the manner mentioned below.

If a timing pulse is generated in wrong timing, a pulse of abnormal amplitude is generated in the servo signal 139 of FIG. 23 and an unintended track jump occurs during the period of the response time width of the tracking servo system immediately after generation of the timing pulse. If this abnormal pulse is detected and used to reset the ¼ frequency divider, the right timing is restored. Insertion of the timing pilot signal is, therefore, not an essential requirement for the configuration of this invention but provides only a means for stability of the reproduction operation.

Another method for eliminating the use of the timing pilot signal is by utilizing the pilot signal of the desired track. As described with reference to FIG. 21, the frequencies of the pilot signals are recorded in good order in the form of $f_0$, $f_1$, $f_2$, $f_0$, $f_1$, $f_2$, $f_0$, $f_1$, $f_2$ and so forth from the outer periphery of the disc. On the reproduction side, therefore, the frequency of largest amplitude among the reproduced pilot signals is selected. If the frequency $f_1$ is selected, the frequencies $f_0$ and $f_2$ are considered corresponding to the lag and lead information respectively; if the frequency $f_2$ is selected, the frequencies $f_1$ and $f_0$ are considered to represent the lag and lead information respectively; and if the frequency $f_0$ is selected, the frequencies $f_2$ and $f_1$ are considered to represent the lag and lead information respectively, so that the discriminators 134 and 135 in FIG. 23 are controlled accordingly.

(3) In the second fundamental embodiment, a total of three pilot signals including the 0-th to 2nd signals are used as tracking information. An alternative is to use four or more pilot signals. In this case, however, the configuration of the discriminators on reproduction side is more complicated.

(4) A configuration of the discriminators was explained with reference to FIG. 24. Another specific configuration of the discriminator is possible to embody the present invention. In FIG. 24, for instance, instead of switching the filter characteristics, three fixed filters are used for envelope detection respectively, thus producing three outputs. Of these three outputs, predetermined two outputs are selected by the switch as lag and lead information respectively. This will be obvious from the description about the sequence of recording of the 0-th to 2nd pilot signals.

(5) In the second fundamental embodiment, it was explained that the main information is FM modulated and the main energy thereof is associated with the frequency band of about 4 MHz or more. In some cases, however, an audio FM signal and other information signal may be superimposed on the main information signal and recorded in the frequency band lower than 4 MHz. In this case, the pilot signal frequency under consideration is inserted in the gap of the frequency band occupied by the information signal.

(6) The second fundamental embodiment concerns the application to the video disc. However, the present invention in the form of the second embodiment is also applicable to the audio PCM disc directly. In PCM techniques, a synchronizing signal for discrimination of sampling sections corresponds to the video horizontal synchronizing signal and therefore is usable in place of the synchronizing signal used in the fundamental embodiment. The embodiment under consideration is also applicable to a system for recording a given information signal on the disc by conversion into a comparatively high frequency.

(7) The explanation of the second fundamental embodiment is based on the assumption of an electrostatic detection type disc. The present invention, however, is also applicable with equal effect to the other recording-/reproduction systems based on the tracking servo including the photo-electric detection type disc, magnetic disc and VTR.

In application to the disc, the track construction need not be spiral but may be of a concentric circle. Also, like the magnetic tape, the construction of adjacent lines may also be employed.

(8) The embodiment under consideration was described with reference to a disc having no grooves. In the case where this embodiment is applied to a mechanical system, however, a groove along the recording pit naturally occurs. If this groove is not deep, no problem is posed on the realization of this embodiment. In spite of it, it has the disadvantage that in the application to the still reproduction mode, the stylus is liable to jump over several tracks. The tracking pilot signal used in this embodiment, however, has a low-frequency band as compared with the main information signal and therefore is detected with a comparatively little aperture deterioration even during the stylus jump. Also, as explained with reference to FIG. 25, it has a restitution ability over ±1.5 tracks. For these two reasons, the special reproduction mode such as still is realized stably.

(9) The embodiment under consideration refers to the case in which a single stylus or head is used in recording or reproduction. This embodiment, however, is applicable also to the case where a plurality of styluses or heads are used. First, in a system in which a plurality of styluses or heads with the scanning track positions thereof controllable independently of each other are used, it is obvious that the above-mentioned embodiment may be applied independently to each reproduction stylus or head as the case may be.

The embodiment under consideration, however, is also applicable effectively to a system in which a plurality of main information signals are recorded or reproduced by use of a plurality of styluses/heads with the scanning position intervals thereof fixed. Some of such applications will be described later.

The second fundamental embodiment and some modifications thereof were described above. A third fundamental embodiment will be next explained. Unlike the second fundamental embodiment requiring three or more tracking pilot signals for track discrimination, the third fundamental embodiment requires only two pilot signals including the 0-th and 1st ones for the purpose of simplification.

By way of explanation, reference will be made to the video disc, and description will first be made of the manner in which the two types of discrimination signals are arranged. Such an arrangement is illustrated in FIG. 28. In the drawing, symbols 0 and 1 denote the positions where the 0-th and 1st tracking pilot signals are recorded respectively. Symbol 4 denotes a pilot signal for indication of the recording position. As seen from this drawing, the pilot signals 0, 1, 4, 0, 1, 4 and so forth are recorded in that order periodically on the (3N+0)th track; the pilot signals 4, 0, 1, 4, 0, 1 and so forth are recorded in that order periodically on the (3N+1)th track; the signals 1, 4, 0, 1, 4, 0 and so forth are recorded in that order periodically on the (3N+2)th track; and so on. The recording positions of the pilot signals correspond to the positions of the horizontal synchronizing signals.

As seen from this arrangement, the pilot signals for the 0-th and 1st tracking are always recorded in the track adjacent rear or forward of the recording position-indicating pilot signal. This discrimination logic makes possible the tracking on the reproduction side.

In recording an image of four fields for each round of track, 1050 horizontal scanning lines are required in NTSC system. This is an integral multiple of three, and therefore, for attaining the arrangement of FIG. 28, the recording order for the pilot signals must be switched for each round of the disc. Otherwise, the same arrangement 0, 1, 4, 0, 1, 4 and so forth results for every track, thus making impossible the discrimination of track sequence. In order to avoid such an inconvenience, a timing pilot signal for indicating the switching point for each round of track, though not shown in the drawing, is separately recorded in position as in the second fundamental embodiment.

Figure 29:
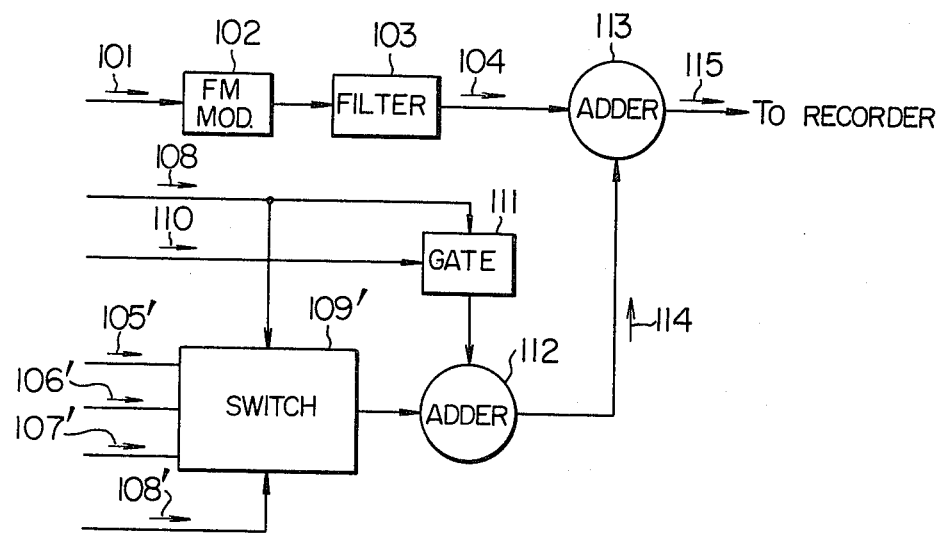
FIG. 29 is a block diagram showing the essential parts of a recording apparatus according to a third fundamental embodiment of the present invention.

Now, departing from the description of the arrangement of the pilot signals, the process of generating the recording signals is shown in FIG. 29. Like reference numerals in FIG. 29 denote like component elements as in FIG. 19. Numeral 105' shows the 0-th pilot signal for tracking, numeral 106' the first tracking pulse, numeral 107' a pilot signal for indicating the recording position with the frequency of, say, 0.6, 1.0 or 1.4 MHz which is the same as in the fundamental embodiment, numeral 108' a horizontal synchronizing signal, and numeral 109' a switch. By means of the switch 109', one of the three pilot signals is picked up in the sequence mentioned in FIG. 28 each time of arrival of the horizontal synchronizing signal 108'. Also, by using the switching pulse 108 indicating the switching point for each disc rotation, the switching is made in the sequence mentioned above.

Figure 30:
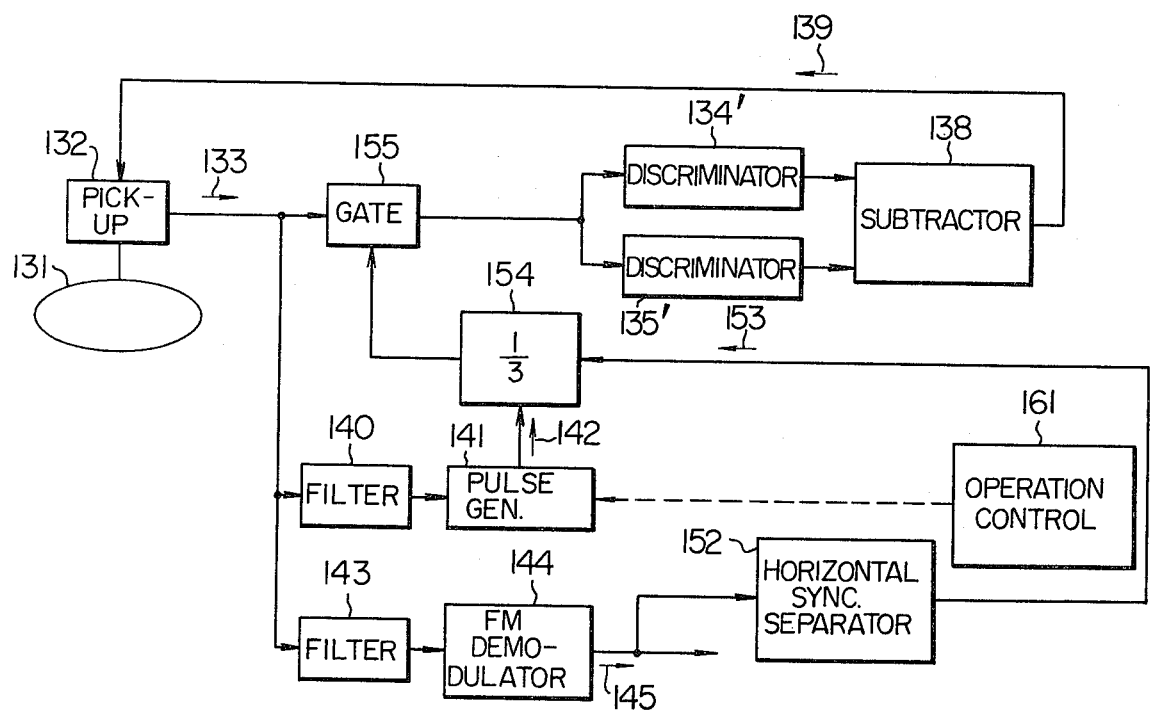
FIG. 30 is a block diagram showing the essential parts of a reproduction apparatus according to a third fundamental embodiment of the present invention.
Figure 31:
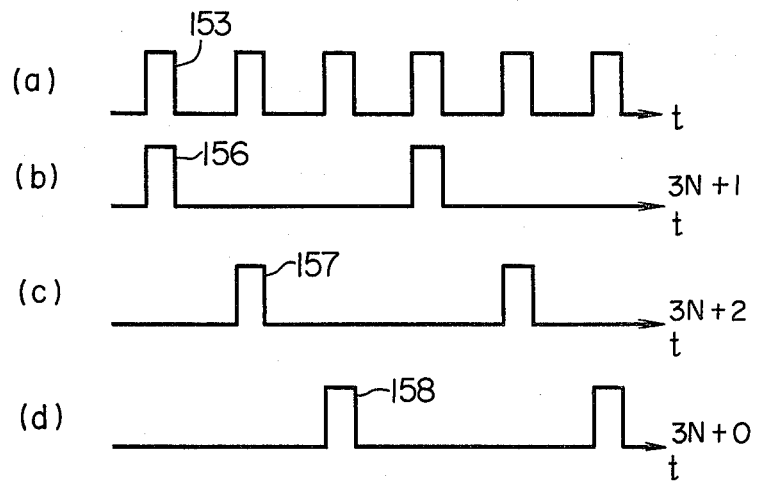
FIG. 31 shows signal waveforms for explaining the reproduction operation.

Explanation of the recording process is now over. Next, the process of reproduction will be described with reference to FIG. 30. In this drawing, like component elements are denoted by like reference numerals as in FIG. 23. In FIG. 23, numeral 152 shows a circuit for separation and reproduction of the horizontal synchronizing signal, which is well known in the television field and the output of which takes the form of the horizontal synchronizing signal 153. Numeral 154 shows ⅓ frequency divider circuit which produces a frequency-divided pulse train as the waveform thereof is shown in FIG. 31. FIG. 31(a) shows a model of the waveform of the horizontal synchronizing signal, the repetition frequency of which is about 64 $\mu$sec. FIGS. 31(b) to (c) show waveforms of frequency-divided pulse trains 156, 157 and 158 respectively with the repetition frequency of about 192 $\mu$sec. The pulse width thereof is assumed to be the same as that of the horizontal synchronizing signal, i.e., about 5 $\mu$sec. The frequency-divided pulse trains 156, 157 and 158 are applied to the gate circuit 155 of FIG. 30 as gate signals for the (3N+1)th, (3N+2)th and (3N+3)th tracks respectively. The switching of these pulse trains from 156 to 157 to 158 to 156 to 157 to 158 and so forth is easily accomplished by applying to the frequency divider 154 the timing pulse 142 detected and generated for the period of disc rotation. The reproduction signal that has passed the gate circuit 155 is applied to the discriminators 134' and 135'. The discriminators 134' and 135' have the function to pick up the 0-th and 1st pilot signals respectively by a frequency selection filter and detect the amplitude thereof. In this way, signals representing the lead and lag information are produced from the discriminators 134' and 135' respectively, with the result that the right servo signal 139 is produced from the subtractor 138.

As is obvious from the foregoing description, the third fundamental embodiment is such that the switching of the filter characteristics is not required but the timing of the gating is required to be switched alternatively.

The foregoing description concerns the reproduction in normal mode. For still reproduction, the application of the timing pulse 142 to the frequency divider 154 is stopped. As a result, as in the second fundamental embodiment, the embodiment under consideration is realized both very simply and stably to the advantage over the prior art. Though not explained in detail, the present invention also permits the special reproduction mode such as slow and quick reproductions.

The third fundamental embodiment of the present invention was described above. Some modifications thereof will be explained below.

(1) In this embodiment, too, as in the second fundamental embodiment, it is possible to enlarge the lateral width of the recording pit only during the recording period for the 0-th and 1st pilot signals. This is effective as a countermeasure against the crosstalks from the adjacent tracks. Especially in the case of recording by use of light beam or electron beam, it is effective if not only the lateral width of the pit is enlarged but also the entire locus of the track pit is shifted in predetermined direction by the well-known light deflection techniques during the pilot recording period. The predetermined direction of shift is the one toward the adjacent track designated by 4 for both the 0-th and 1st pilot recording periods in FIG. 28. In other words, the track designated by 0 is shifted downward and the track designated by 1 upward for recording in FIG. 28.

(2) In the third fundamental embodiment, the recording of the pilot signal for indicating the recording position designated by 4 in FIG. 28 may be done without. This pilot signal may also be separately detected by the reproduction system and used as an input gate signal to the gate circuit 155 in FIG. 30, even though it may be eliminated as explained with reference to the third fundamental embodiment.

(3) The third fundamental embodiment concerns the application to the NTSC system having the horizontal period of 1050 scanning lines for each disc rotation. In PAL or SECAM system, however, the horizontal period includes 1250 scanning lines for each disc rotational period (corresponding to four fields). The number 1250 is not divisible by three, the remainder being two. Because of this characteristic of the PAL and SECAM systems, the pattern shown in FIG. 28 is obtained without switching the recording sequence of the pilot signals for each track round. The difference between the recording point of the first pilot signal of the (3N+0)th track and the recording point just below that, for example, is 1250 times the horizontal period, and therefore it is seen that the direct sequential counting will lead to successful relay to the 0-th pilot signal. In the application to the PAL or SECAM systems, therefore, the timing pilot signal is not required.

(4) Although the third fundamental embodiment was described as an application to the video disc, the same embodiment may also be applied with equal effect to the recording/reproduction of audio and other information. Further, it is applicable to VTR, too.

An example of application to recording/reproduction with a plurality of styluses/heads will be explained below.

Generally, assume that a set of K tracks adjacent to each other are recorded or reproduced simultaneously by use of K styluses/heads, where K is an integer not less than two. In this case, also assume that the end tracks of each set are made contiguous to the end tracks of adjacent sets of tracks in the surface of the recorded medium and that three or more different tracking pilot signals are recorded in the adjacent tracks. Then, in reproduction, at least one of the outputs of the K reproduction styluses/heads is discriminated by the discriminators 134 and 135 of FIG. 23, thus producing the servo signal 139. Instead of this method, it is of course possible to produce servo signals from the plurality of outputs of K reproduction styluses/heads and add them to each other to obtain an average servo signal, by which to control the entire system of reproduction styluses/heads.

In the system using fixed K styluses/heads, however, it is not absolutely required to record three or more different tracking pilot signals, but instead two different pilot signals for the 0-th and 1st tracking alone may be used more simply as mentioned below.

First, it K is not less than three, no tracking signal is recorded in one of the reference styluses/heads between those at extreme ends. The remaining K−1 styluses/heads are divided into the forward and rear groups with respect to the reference stylus/head, so that the 0-th tracking pilot signal is allotted to the forward group and the 1st tracking pilot signal to the rear group. For reproduction, the output of the reference stylus/head is applied to a discriminator similar to the discriminators 134 and 135 of FIG. 23, thus producing a servo signal 139. In the configuration of the discriminator 134, the switch 151 of FIG. 24 is not required and may be replaced by a fixed-type filter for selecting the first tracking pilot signal representing the lag information. Also, the discriminator 135 corresponds to the fixed-type filter for selecting the 0-th tracking pilot signal representing the lead information.

Figure 32:
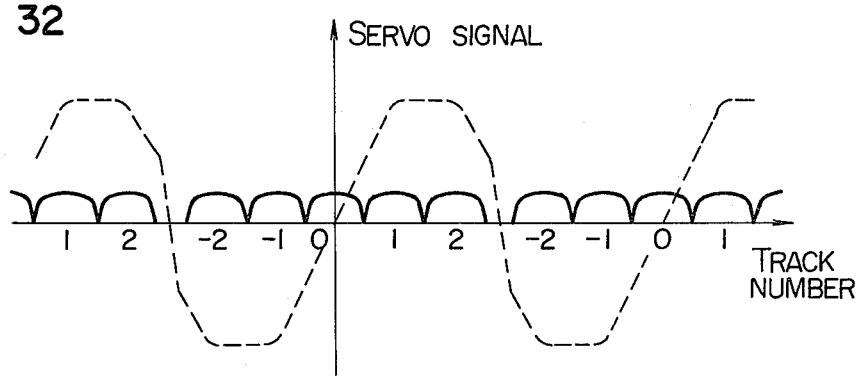
FIGS. 32 and 33 show discrimination characteristic curves for explaining the tracking discrimination when plural styluses/heads are used.

In this way, the servo signal 139 is obtained by a configuration of the discriminators 134 and 135 without any switch. The dotted line of FIG. 32 is an illustrative indication of the discrimination logic characteristics in a graph with the abscissa thereof representing the scanning track position of the central stylus/head and the ordinate the servo signal in the case K=5. In the graph, numerals along the abscissa show track numbers assigned for each group of K. The 0-th pilot signal is recorded in the track with a negative number, and the 1st pilot signal in the track with a positive number. The space between the groups each containing K styluses/heads may be either eliminated or provided as a guard band between the groups.

Figure 33:
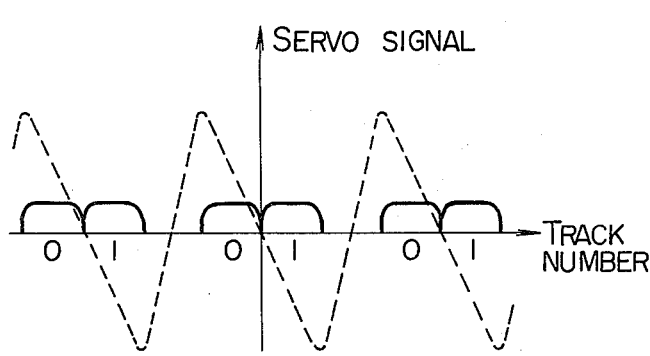

Next, if K is 2, the simplified system mentioned below is applicable on the condition that the guard band is provided between groups each containing two tracks at the time of recording. The 0-th pilot signal is recorded in the 0-th track of the track pair, and the 1st pilot signal in the 1st track. At the time of reproduction, the first pilot signal detected from the 0-th track reproduction stylus/head is subjected to differential comparison with the 0-th pilot signal detected from the first track reproduction stylus/head thereby producing a servo signal. The relation between the scanning position of the stylus/head and the servo signal is shown by dotted line in FIG. 33.

Figure 34:
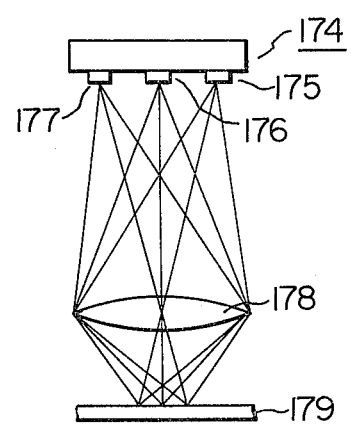
FIG. 34 is a side view of the essential parts of the recording-reproduction system used for recording-reproduction by a multi-spot laser.

A recent example of technique for a plurality of styluses/heads in fixed relation includes a configuration of the multi-spot laser recording/reproduction system using a plurality of semiconductor lasers as shown in FIG. 34. In this drawing, numeral 174 shows a substrate mounted with three laser beam sources 175, 176 and 177. The intensity of each laser beam is modulated in accordance with the recording signal. Numeral 178 shows a lens, and numeral 179 a part of a rotary disc having a surface covered with a thin metal film and formed with a pit array in accordance with the recording light. At the time of reproduction, the well-known self-coupling effect of the semiconductor laser is utilized, so that the variation in voltage at the terminal impressed with the current supplied to each laser beam which changes with the amount of each return beam modulated by the pit array is detected for reproduction of information. The tracking actuator uses the well-known technique of displacing the entire components 174 to 178 at the same time by electromagnetic force, though the detail thereof is not shown in the drawing. The above-mentioned configuration of the present invention may be applicable to such a system.

By utilizing the latest semicoductor laser technique as mentioned above, the exclusive pilot beam in the prior art the overcoming of which is an object of the invention is easily realized, and therefore it seems that the advantage of this invention is adversely affected. However, provision of a separate exclusive pilot beam leads to a high cost of the recording system. An economical value is derived, on the other hand, by doubling the main information recording beam as the pilot beam as mentioned above with reference to the embodiments.

We claim:

1. A high density system comprising means for recording a high frequency signal modulated with an information signal as a pit array on a recording medium in time sequence along a multiplicity of tracks adjacent to each other, the pit arrays of the tracks being arranged so that the track pitch of the pit arrays is less than an information reproducing element width thereby providing high density recording on the recording medium, said information signal including a synchronzing signal, said recording means recording said modulated high frequency signal by superimposing a discrimination signal on said modulated high frequency signal to modulate the duty factor of each pit in the array in accordance with said discrimination signal, said recording means including means for generating said discrimination signal having a frequency spectrum lower than that of said modulated high frequency signal and having a predetermined phase difference between the adjacent tracks, said discrimination signal frequency having a predetermined relation with respect to the frequency of said synchronizing signal.

2. A high density system according to claim 1, further comprising means for reproducing said information signal including means for separating and picking up said discrimination signal from said modulated high frequency signal on the basis of the frequency difference therebetween, means for detecting said synchronizing signal and providing an output in accordance therewith, and means for comparing the output of said synchronizing signal detecting means and said discrimination signal for producing an output indicative of lead and lag of the track to be reproduced for enabling reproduction of the proper track of the high density recorded tracks.

3. A high density system comprising means for recording a high frequency signal modulated with an information signal as a pit array on a recording medium in time sequence along a multiplicity of track turns arranged adjacent to each other and forming one complete spiral track, the pit arrays of the track turns being arranged so that the track turn pitch of the pit arrays is less than an information reproducing element width thereby providing high density recording on the recording medium, said recording means recording said modulated high frequency signal by superimposing a discrimination signal on said modulated high frequency signal to modulate the duty factor of each pit in the array in accordance with said discrimination signal, said recording means including means for generating said discrimination signal having a frequency spectrum lower than that of said modulated high frequency signal and having different frequencies between the adjacent track turns in a predetermined periodical order along the successive track turns, the frequency of said discrimination signal being constant within one cycle turn of said successive track turns, and the number of different frequencies of said discrimination signal being smaller than the number of track turns on the recording medium with the different frequencies being utilized repeatedly in the predetermined periodical order along the successive track turns.

4. A high density system according to claim 3, further comprising means for reproducing said information signal including means for separating and picking up said discrimination signal from said modulated high frequency signal on the basis of the frequency difference therebetween, and means for producing an output indicative of lead and lag of the track turn to be reproduced on the basis of the frequency discrimination of said discrimination signal for enabling reproduction of the proper track turn of the high density recorded track turns.

5. In a reproducing system wherein a recording medium includes means for storing an information signal modulated on a high frequency signal and recorded as a pit array on the recording medium in time sequence along a multiplicity of tracks adjacent to each other and arranged with high density on the recording medium, the information signal including a synchronizing signal and having a discrimination signal superimposed on the modulated high frequency signal so as to modulate the duty factor of each pit in the array in accordance with the discrimination signal, the discrimination signal occupying a frequency spectrum lower than that of the modulated high frequency signal and having a predetermined phase difference between the adjacent tracks, the discrimination signal having a predetermined relation with respect to the frequency of the synchronizing signal, means for reproducing the information signal including means for separating and picking up the discrimination signal from the modulated high frequency signal on the basis of the frequency difference therebetween, means for detecting the synchronizing signal and providing an output in accordance therewith, and means for comparing the output of said synchronizing signal detecting means and the discrimination signal for producing an output indicative of lead and lag of the track to be reproduced for enabling reproduction of the proper track of the high density recorded tracks.

6. In a reproducing system wherein a recording medium includes means for storing an information signal modulated on a high frequency signal and recorded as a pit array on the recording medium in time sequence along a multiplicity of track turns arranged adjacent to each other with a high density and forming one complete spiral track, the modulated high frequency signal having a discrimination signal superimposed thereon to modulate the duty factor of each pit in the array in accordance with the discrimination signal, the discrimination signal occupying a frequency spectrum lower than that of the modulated high frequency signal and having different frequencies between the adjacent track turns in a predetermined periodical order along the successive track turns, the frequency of the discrimination signal being constant within one cycle turn of the successive tracks, and the number of different frequencies of the discrimination signal being smaller than the number of track turns on the recording medium with the different frequencies being utilized in the predetermined periodical order along the successive track turns, means for reproducing the information signal including means for separating and picking up the discrimination signal from the modulated high frequency signal on the basis of the frequency difference therebetween, and means for producing an output indicative of lead and lag of the track turn to be reproduced on the basis of the frequency discrimination of the discrimination signal for enabling reproduction of the proper track turn of the high density recorded track turns.

7. A system according to claim 6, wherein said means for separating and picking up the discrimination signal includes a plurality of discriminators for detecting the discrimination signal.

8. A system according to claim 4 or claim 7 wherein three different frequencies are utilized in the predetermied periodical order along the successive track turns, the frequencies being about 600 KHz, 800 KHz and 1 MHz respectively.

* * * * *